United States Patent
Tsunoda et al.

(10) Patent No.: US 8,184,355 B2
(45) Date of Patent: May 22, 2012

(54) LIGHT MODULATION DEVICE

(75) Inventors: Yukito Tsunoda, Kawasaki (JP);
Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 12/230,792

(22) Filed: Sep. 4, 2008

(65) Prior Publication Data
US 2009/0141333 A1 Jun. 4, 2009

(30) Foreign Application Priority Data
Nov. 30, 2007 (JP) ................. 2007-309785

(51) Int. Cl.
*G02F 1/00* (2006.01)
*G02F 1/01* (2006.01)
*G02B 26/00* (2006.01)

(52) U.S. Cl. ........... 359/279; 359/237; 359/238

(58) Field of Classification Search ....... 385/3; 359/237, 359/238, 279; 398/188; 375/283, 308; 332/103
See application file for complete search history.

(56) References Cited

U.S. PATENT DOCUMENTS 7,450,288 B2 * 11/2008 Kikuchi ............ 359/239
2003/0147591 A1 * 8/2003 Doi et al. ............ 385/39
2007/0065161 A1 3/2007 Miura et al.
2009/0092401 A1 * 4/2009 Sekine et al. ........ 398/185

OTHER PUBLICATIONS

Patent Abstracts of Japan, Publication No. 2007-043638, Published Feb. 15, 2007.
Patent Abstracts of Japan, Publication No. 2007-082094, Published Mar. 29, 2007.

* cited by examiner

*Primary Examiner* — Ricky Mack
*Assistant Examiner* — Mahidere Sahle
(74) *Attorney, Agent, or Firm* — Staas & Halsey LLP

(57) ABSTRACT

A light modulation device capable of stabilizing a phase set in phase modulation processing and improving optical communication quality. A phase modulator is provided for each of plural branched input lights and performs phase modulation of the input light. A phase shifter is provided at the upstream or downstream of the phase modulator and shifts a phase of the input light or of the phase-modulated light. A light interference section causes the output lights from the light modulator to interfere with each other to generate a multilevel phase modulated signal and interference light having a phase state different from that of the modulated signal. A monitor receives the interference light and outputs an electric signal according to the intensity. A phase shift controller generates a phase control signal based on the electric signal and applies the signal to the shifter to control the phase shift amount to be set by the shifter.

17 Claims, 27 Drawing Sheets

|  | PORT p3 OUTPUT |
|---|---|
| PORT p1 INPUT | 0 |
| PORT p2 INPUT | 0 |

FIG. 10

|  | PORT p6 OUTPUT | PORT p7 OUTPUT |
|---|---|---|
| PORT p4 INPUT | $\pi/4$ | $-\pi/4$ |
| PORT p5 INPUT | $-\pi/4$ | $\pi/4$ |

FIG. 12

LIGHT MODULATION DEVICE

CROSS-REFERENCE TO RELATED APPLICATIONS

This application is based upon and claims the benefits of priority from the prior Japanese Patent Application No. 2007-309785, filed on Nov. 30, 2007, the entire contents of which are incorporated herein by reference.

BACKGROUND OF THE INVENTION

1. Field

The present invention relates to a light modulation device. The present invention more particularly relates to a light modulation device for modulating an optical signal.

2. Description of the Related Art

Recently, higher-capacity and longer-distance in an optical transmission system is being promoted. For a method effective in promoting the higher-capacity and longer-distance transmission, introduction of a system using the Multiple Phase Shift Keying represented by DQPSK (Differential Quadrature Phase Shift Keying) is taken notice of.

FIG. 23 shows a general multilevel optical phase modulator. The multilevel optical phase modulator 50 comprises an LD (Laser Diode) 51, a branching section 52, phase modulators 53a and 53b, a 2×1 optical multiplexer 54, a $\pi/2$ phase shifter 55, a PD (Photo Diode) 56 and a phase shift controller 57. The modulator 50 is a phase modulator for generating a DQPSK signal.

The LD 51 emits continuous wave light. The branching section 52 branches the continuous wave light into two so as to input one branched light into an optical waveguide of the phase modulator 53a and to input the other branched light into the $\pi/2$ phase shifter 55. The $\pi/2$ phase shifter 55 shifts the phase of the electric field of the light by $\pi/2$ so as to input the phase-shifted light into an optical waveguide of the phase modulator 53b.

Both of the phase modulators 53a and 53b include a Mach-Zehnder Interferometer. Near parallel waveguides 53a-1 and 53a-2 of the phase modulator 53a, signal electrodes 5a-1 and 5a-2 are provided, respectively. Near parallel waveguides 53b-1 and 53b-2 of the phase modulator 53b, signal electrodes 5b-1 and 5b-2 are provided, respectively. To the signal electrodes 5a-1 and 5a-2, i1 and i1n (i1n is an inversion signal of i1) as I signals having a complementary relation are inputted. To the signal electrodes 5b-1 and 5b-2, q1 and q1n (q1n is an inversion signal of q1) as Q signals having a complementary relation are inputted.

The phase modulator 53a changes the phase of the input light in a manner corresponding to the 0 s and 1 s of the I signal. The phase modulator 53b changes the phase of the $\pi/2$ phase-shifted input light in a manner corresponding to the 0 s and 1 s of the Q signal. The 2×1 optical multiplexer 54 multiplexes modulated light s1 outputted from the phase modulator 53a and modulated light s2 outputted from the phase modulator 53b to generate a DQPSK signal d1.

The PD 56 receives the DQPSK signal d1 and outputs an electric signal according to the light power. The phase shift controller 57 generates a phase control signal based on the electric signal, and adjusts and controls the phase shift amount of the $\pi/2$ phase shifter 55.

Here, due to the electric field applied to the optical waveguide of the phase modulator 53a, the refractive indexes of the parallel waveguides 53a-1 and 53a-2 change, respectively. As a result, the phase difference between the parallel waveguides 53a-1 and 53a-2 changes, and thus there is outputted from the output waveguide the modulated light s1 that is intensity-modulated such that the intensity of the optical signal increases if the phase difference between the parallel waveguides 53a-1 and 53a-2 is 0° and decreases if the phase difference is $\pi$.

Similarly, due to the electric field applied to the optical waveguide of the phase modulator 53b, the refractive indexes of the parallel waveguides 53b-1 and 53b-2 change, respectively. As a result, the phase difference between the parallel waveguides 53b-1 and 53b-2 changes. In the phase modulator 53b, however, since the optical signal phase-shifted by $\pi/2$ at the upstream side is inputted, there is eventually outputted from the output waveguide the modulated light s2 that is intensity-modulated such that the intensity of the optical signal increases if the phase difference between the parallel waveguides 53b-1 and 53b-2 is $\pi/2$ and decreases if the phase difference is $3\pi/2$.

FIG. 24 is a phase diagram illustrating Quadrature Phase Shift Keying. The horizontal axis represents a real part Re and the vertical axis represents an imaginary part Im. When the phase modulator 53a modulates light in accordance with the I signal, the modulated signal assumes either 0 (I=0) or $\pi$ (I=1) on the real axis. When the phase modulator 53b modulates light in accordance with the Q signal, the modulated signal assumes either $\pi/2$ (Q=0) or $3\pi/2$ (Q=1) on the imaginary axis, because it is rotated by $\pi/2$ with respect to the I signal.

Multiplexing these modulated lights by the 2×1 optical multiplexer 54 means performing additions along the orthogonal real and imaginary axes in the phase diagram, and therefore, the resultant DQPSK signal d1 assumes one of the four phase states $\pi/4$ (0,0), $3\pi/4$ (1,0), $5\pi/4$ (1,1) and $7\pi/4$ (0,1) (every adjacent phases are orthogonal).

FIG. 25 shows one example of the phase states of the DQPSK signal d1 outputted from the multilevel optical phase modulator 50. The horizontal axis represents the time and the vertical axis represents the light intensity. From the phase modulator 53a, the modulated light s1 is outputted at a phase such as $0, \pi, 0, \pi, 0, 0, 0, \ldots$. From the phase modulator 53b, the modulated light s2 is outputted at a phase such as $\pi/2, \pi/2, 3\pi/2, 3\pi/2, \pi/2, \pi/2, 3\pi/2, \ldots$.

In the modulated light s1, only the phases are different from each other such as 0 and $\pi$. The signal intensity when the phase is 0 and the signal intensity when the phase is $\pi$ are the same (in FIG. 24, a distance from the origin of coordinates to 0 on the real axis and a distance from the origin of coordinates to $\pi$ on the real axis are the same.), and the waveform when the phase is 0 and the waveform when the phase is $\pi$ are the same.

In the modulated light S2, only the phases are different from each other such as $\pi/2$ and $3\pi/2$. The signal intensity when the phase is $\pi/2$ and the signal intensity when the phase is $3\pi/2$ are the same (in FIG. 24, a distance from the origin of coordinates to $\pi/2$ on the imaginary axis and a distance from the origin of coordinates to $3\pi/2$ on the imaginary axis are the same.), and the waveform when the phase is $\pi/2$ and the waveform when the phase is $3\pi/2$ are the same.

Multiplexing these modulated lights s1 and s2 by the 2×1 optical multiplexer 54 means performing additions along the orthogonal real and imaginary axes in the phase diagram, and therefore, the resultant DQPSK signal d1 assumes the phase states $\pi/4, 3\pi/4, 7\pi/4, 5\pi/4, \pi/4, \pi/4, 7\pi/4, \ldots$.

Thus, the multilevel optical phase modulator 50 performs separate phase modulations using the I and Q signals, respectively, and multiplexes the phase-modulated components together with the phase of the electric field of the light shifted by $\pi/2$, thereby performing 4-level quadrature phase shift keying.

Further, the multilevel optical phase modulator 50 performs the feedback control of the optical power monitoring result of the DQPSK signal d1. Thereby, the modulator 50 always performs the phase adjustment such that a phase difference between an optical signal applied to the phase modulator 53a and that applied to the phase modulator 53b is equal to π/2.

For the conventional technique for stabilizing a phase difference based on the output light of the phase modulator, Japanese Unexamined Patent Application Publication No. 2007-43638 (paragraph numbers [0019] to [0021], FIG. 4) and Japanese Unexamined Patent Application Publication No. 2007-82094 (paragraph numbers [0016] to [0032], FIG. 4) are disclosed.

For outputting the above-described DQPSK signal d1, a phase difference between the modulated lights s1 and s2 inputted into the 2×1 optical multiplexer 54 must be exactly equal to π/2.

FIG. 26 shows a concept of the deviation of a phase difference. When the phase difference between the modulated lights s1 and s2 is larger than π/2, the imaginary axis tilts in the left direction with respect to the real axis, whereas when the phase difference is smaller than π/2, the imaginary axis tilts in the right direction with respect to the real axis.

Accordingly, when the π/2 phase difference between the modulated lights s1 and s2 is always kept, namely, when the modulated lights are accurately phase-shifted from each other by π/2 via the phase shift controller 57, the correct DQPSK signal d1 can be generated.

Here, assuming that $E_0$ is an amplitude, continuous wave light is represented by formula (1). Further, the modulated light s1 is represented by formula (2), the modulated light s2 is represented by formula (3), and the DQPSK signal d1 is represented by formula (4). The phase-modulated signal components are here omitted.

$$f1 = E_0 \exp j(\omega t) \quad (1)$$

$$s1 = \frac{1}{\sqrt{2}} E_0 \exp j(\omega t) \quad (2)$$

$$s2 = \frac{1}{\sqrt{2}} E_0 \exp j(\omega t + \phi) \quad (3)$$

$$d1 = \cos(\phi/2) E_0 \exp j(\omega t + \phi/2) \quad (4)$$

FIG. 27 shows the DQPSK signal d1. The horizontal axis represents the phase, and the vertical axis represents the light intensity. FIG. 27 shows a function curve of the DQPSK signal d1 represented by formula (4) ($\cos(\phi/2) \cdot E_0$ in formula (4) represents the light intensity). Further, the output power of the DQPSK signal d1 generated when a phase difference between the modulated lights s1 and s2 is equal to $\phi = \pi/2$ is expressed as pw (that is, $\cos(\pi/2/2) \cdot E_0$, and therefore, $pw = (2^{1/2}/2) \cdot E_0$).

In the multilevel optical phase modulator 50, the phase shift controller 57 applies a phase control signal to the π/2 phase shifter 55 to perform feedback control such that the output power of the DQPSK signal d1 is equal to pw.

However, as is apparent from FIG. 27, the output power pw is an intermediate value between the conditions where the light intensity received by the PD 56 is maximized and those where the light intensity is minimized. Therefore, it is difficult to always detect during the operation the intermediate value of the output intensity, which is the optimal point with respect to the DQPSK signal d1, and to perform the phase shift control such that the output intensity is equal to the intermediate value. Accordingly, to stabilize the phase difference of π/2, a complicated structure and control are required as disclosed in the above-described conventional technique (Japanese Unexamined Patent Application Publications Nos. 2007-43638 and 2007-82094).

On the other hand, there is considered a method of previously measuring the maximum intensity and the minimum intensity of the DQPSK signal d1 to calculate the intermediate value, setting the calculated value in the device and performing the phase shift control such that the output intensity of the signal d1 is equal to this intermediate value. In this case, since the maximum intensity and the minimum intensity change due to aged deterioration of the LD 51, a real intermediate value also changes. As a result, a big error occurs between the set intermediate value and the real intermediate value.

SUMMARY

In view of the foregoing, it is an object of the present invention to provide a light modulation device in which a phase variably set in the phase modulation is stabilized by a simple structure and a control to improve optical communication quality.

To accomplish the above-described object, there is provided a light modulation device for modulating an optical signal. The light modulation device comprises: a light modulator including a phase modulator which is provided for each of a plurality of input lights and which performs phase modulation of the input light, and a phase shifter which is provided at the upstream or downstream of at least one of the phase modulators and which shifts a phase of the input light or a phase of the phase-modulated light; and a light interference section for causing a plurality of output lights outputted from the light modulator to interfere with each other, wherein: the light interference section causes the output lights to interfere with each other to generate a multilevel phase modulated signal and a monitoring interference light having a phase state different from that of the multilevel phase modulated signal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 shows a phase relationship between input light and output light of the 2×1 optical multiplexer.
FIG. 12 shows a phase relationship between input light and output light of the 2×2 optical coupler.

DESCRIPTION OF THE PREFERRED EMBODIMENTS

Figure 1:
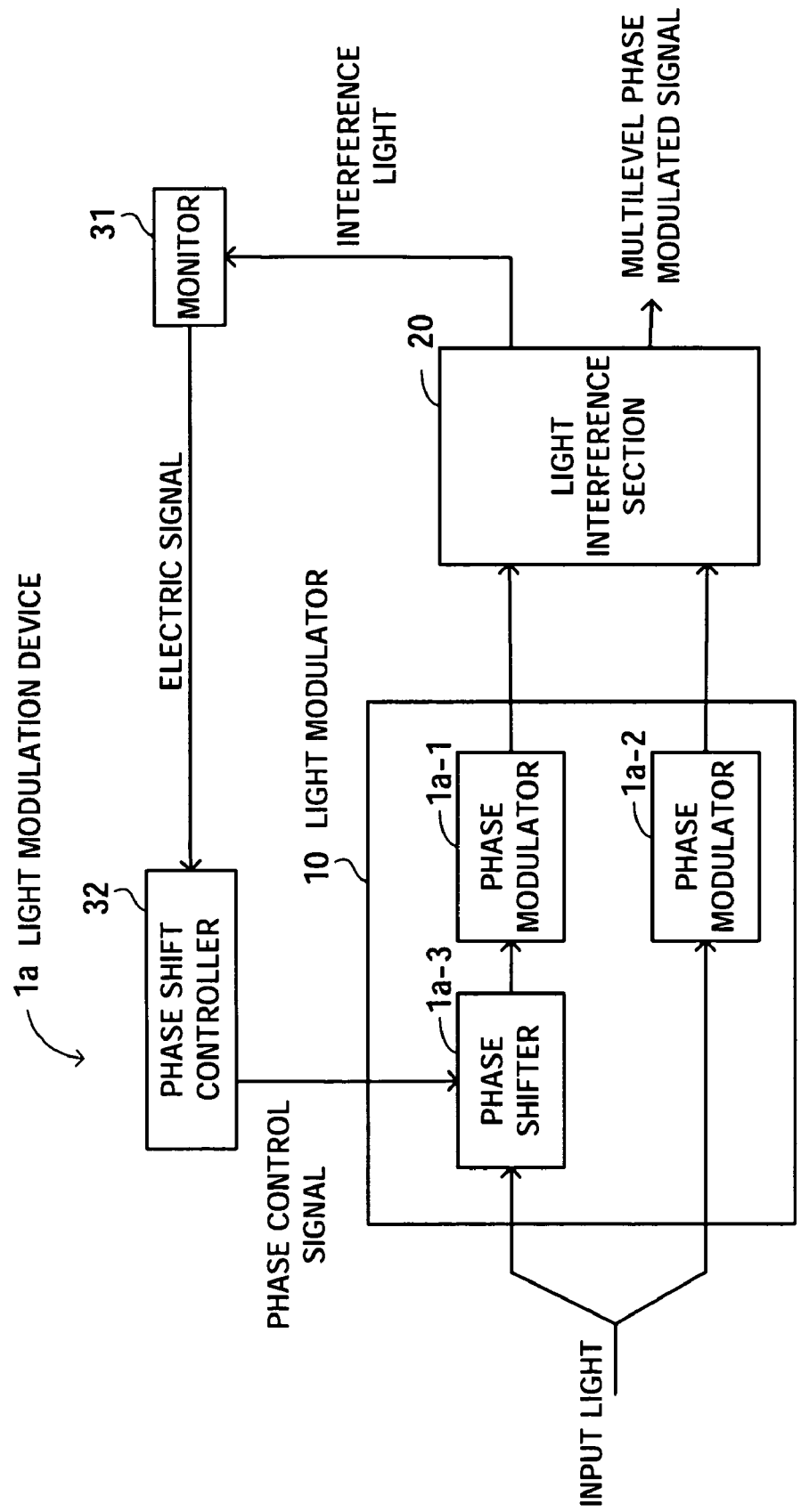
FIG. 1 shows a principle of a light modulation device.

Preferred embodiments of the present invention will be described in detail below with reference to the accompanying drawings, wherein like reference numerals refer to like elements throughout. FIG. 1 shows a principle of a light modulation device. A light modulation device 1a comprises a light modulator 10, a light interference section 20, a monitor 31 and a phase shift controller 32. The light modulator 10 includes phase modulators 1a-1 and 1a-2, and a phase shifter 1a-3.

The phase modulators 1a-1 and 1a-2 are provided for each of a plurality of branched input lights and performs phase modulation of the input lights. The phase shifter 1a-3 is provided at the upstream (or downstream) of the phase modulator 1a-1 or 1a-2 and variably shifts a phase of the input light (or a phase-modulated optical signal) based on an applied phase control signal.

The light interference section 20 causes a plurality of output lights outputted from the light modulator 10 to interfere with each other to generate a multilevel phase modulated signal and an interference light having a phase state different from that of the multilevel phase modulated signal.

Here, the term "to generate the interference light having a phase state different from that of the multilevel phase modulated signal" means, for example, that "to generate the interference light as the signal light having, in the case where the multilevel phase modulated signal generated when the phase is φ has an intensity of pw1, an intensity other than pw1 when its own phase (the phase of the interference light itself) is φ.

More specifically, the light interference section 20 generates, in the case of generating the multilevel phase modulated signal when a phase set by the phase shifter 1a-3 is φ, the interference light having a phase state where the light intensity is maximized or minimized when its own phase is φ (when the phase of the interference light itself is φ).

The monitor section 31 receives the interference light and outputs an electric signal according to the intensity. The phase shift controller 32 generates a phase control signal based on the electric signal and applies the phase control signal to the phase shifter 1a-3 to control the phase shift amount to be set by the phase shifter 1a-3.

Figure 2:
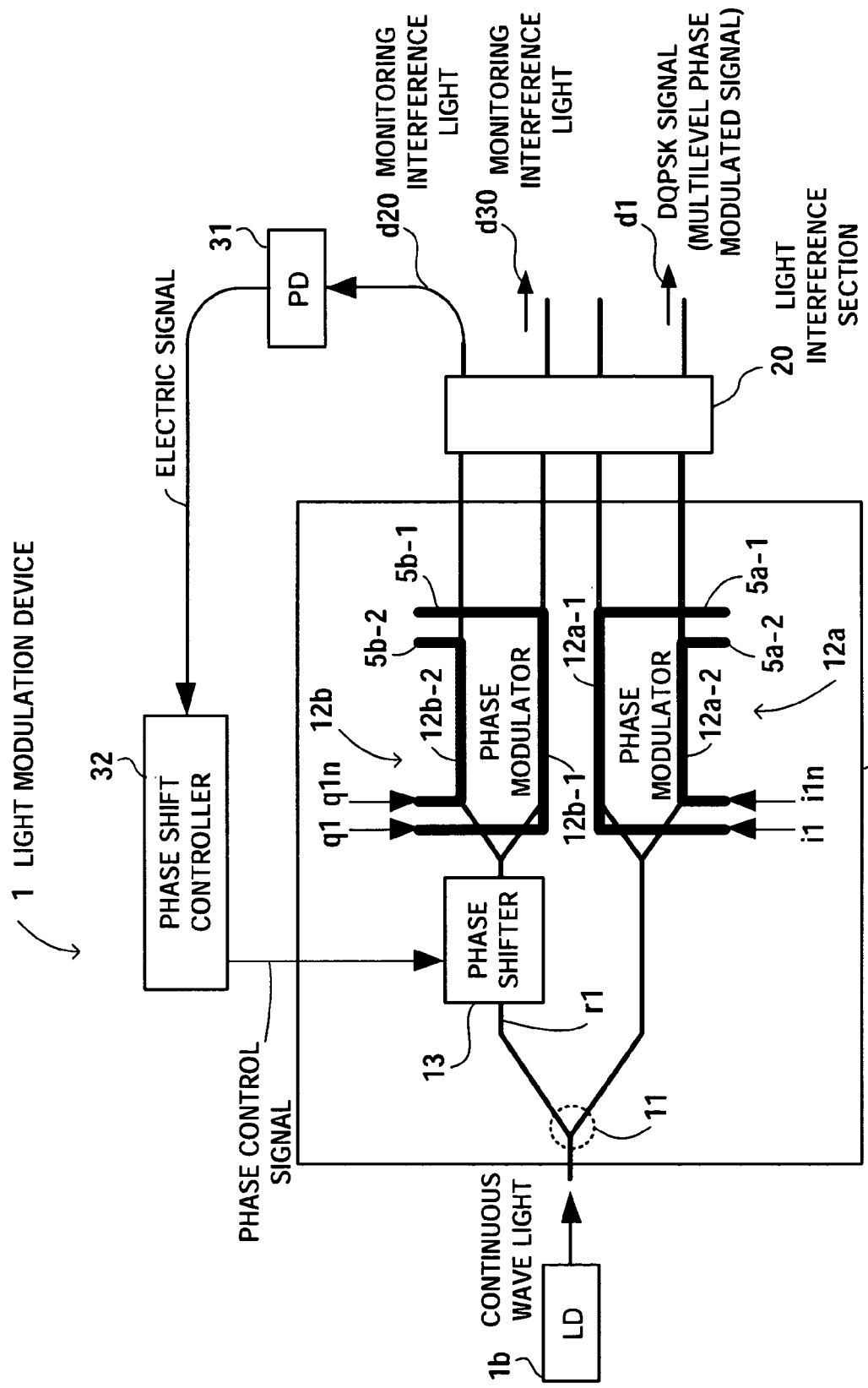
FIG. 2 shows a structure of a light modulation device.

Next, as one example of the multilevel phase modulation, a case of applying the light modulation device 1a to the optical phase modulator for performing light modulation of DQPSK signal will be hereinafter described in detail. FIG. 2 shows a structure of the light modulation device.

A light modulation device 1 comprises an LD 1b, a light modulator 10, a light interference section 20, a PD 31 and a phase shift controller 32. The device 1 is an optical phase modulator for generating a DQPSK signal as a multilevel phase modulated signal.

The light modulator 10 includes a branching section 11, phase modulators 12a and 12b (corresponding to the phase modulators 1a-1 and 1a-2), and a phase shifter 13 (corresponding to the phase shifter 1a-3).

The LD 1b emits continuous wave light. The branching section 11 branches the continuous wave light into two so as to input one branched light into an optical waveguide of the phase modulator 12a and to input the other branched light into the phase shifter 13. The phase shifter 13 shifts the phase of the electric field of light by φ (φ=π/2 in this example) based on the applied phase control signal and inputs the phase-shifted light to an optical waveguide of the phase modulator 12b.

Both of the phase modulators 12a and 12b include a Mach-Zehnder Interferometer. Near parallel waveguides 12a-1 and 12a-2 of the phase modulator 12a, signal electrodes 5a-1 and 5a-2 are provided, respectively. Near parallel waveguides 12b-1 and 12b-2 of the phase modulator 12b, signal electrodes 5b-1 and 5b-2 are provided, respectively.

The phase modulator 12a changes a phase of the input light while causing the phase to correspond to the values 0 and 1 of the I signal. The phase modulator 12b changes a phase of the π/2 phase-shifted input light while causing the phase to correspond to the values 0 and 1 of the Q signal.

In the phase modulator 12a, an I signal i1 is inputted to the signal electrode 5a-1, and an I signal i1n (an inversion signal of the I signal i1) is inputted to the signal electrode 5a-2. Due to the electric field applied at this time to the optical waveguides of the phase modulator 12a, the refractive indexes of the parallel waveguides 12a-1 and 12a-2 change by +Δn and −Δn, respectively. As a result, the phase difference between the parallel waveguides 12a-1 and 12a-2 changes, and thus there is outputted to the light interference section 20 the output light that is intensity-modulated such that the intensity of the output light increases if the phase difference between the parallel waveguides 12a-1 and 12a-2 is 0° and decreases if the phase difference is π.

Similarly, in the phase modulator 12b, a Q signal q1 is inputted to the signal electrode 5b-1 and a Q signal q1n (an inversion signal of the Q signal q1) is inputted to the signal electrode 5b-2. Due to the electric field applied at this time to the optical waveguides of the phase modulator 12b, the refractive indexes of the parallel waveguides 12b-1 and 12b-2 change, respectively. In the phase modulator 12b, however, since the optical signal phase-shifted by π/2 at the upstream side is inputted, there is eventually outputted to the light interference section 20 the output light that is intensity-modulated such that the intensity of the optical signal increases if the phase difference between the parallel waveguides 12b-1 and 12b-2 is π/2 and decreases if the phase difference is 3π/2.

On the other hand, the light interference section 20 causes a plurality of output lights outputted from the light modulator 10 to interfere with each other to generate a DQPSK signal d1 and monitoring interference lights d20 and d30 as interference light for monitor, which have a phase state different from that of the DQPSK signal d1.

At this time, the light interference section 20 causes two output lights outputted from the light modulator 10, which are phase-shifted from each other by π/2(=ϕ), to interfere with each other to newly generate a phase in which the intensity is maximized when its own phase is π/2. Thereby, the section 20 generates the monitoring interference light d20 having a phase state different from that of the DQPSK signal d1.

Alternatively, the section 20 newly generates a phase in which the intensity is minimized when its own phase is π/2, thereby generating the monitoring interference light d30 having a phase state different from that of the DQPSK signal d1 (specific relational expressions of the monitoring interference lights d20 and d30 will be described later).

The PD 31 receives the monitoring interference light (any one of the monitoring interference lights d20 and d30 may be selected) and outputs an electric signal according to the light power of the monitoring interference light. The phase shift controller 32 generates a phase control signal based on the electric signal to control the phase shift amount of the phase shifter 13.

When the monitoring interference light d20 is selected, the controller 32 controls the phase shift amount of the phase shifter 13 such that the light intensity received by the PD 31 is maximized. When the monitoring interference light d30 is selected, the controller 32 controls the phase shift amount of the phase shifter 13 such that the light intensity received by the PD 31 is minimized.

The phase shifter 13 is specifically an electrode provided near an optical waveguide r1. When a phase control signal is applied to the electrode, a phase of an electric field of light flowing through the optical waveguide r1 is controlled.

Assuming here that $E_0$ is an amplitude and ϕ is the phase shift amount set by the phase shifter 13, the DQPSK signal d1 is represented by the above-described formula (4), the monitoring interference light d20 is represented by formula (5), and the monitoring interference light d30 is represented by formula (6).

$$d20 = \cos(\pi/4 - \phi/2) E_0 \exp j(\omega t + \phi/2) \quad (5)$$

$$d30 = \cos(\pi/4 - \phi/2) E_0 \exp j(\omega t + \phi/2) \quad (6)$$

Figure 3:
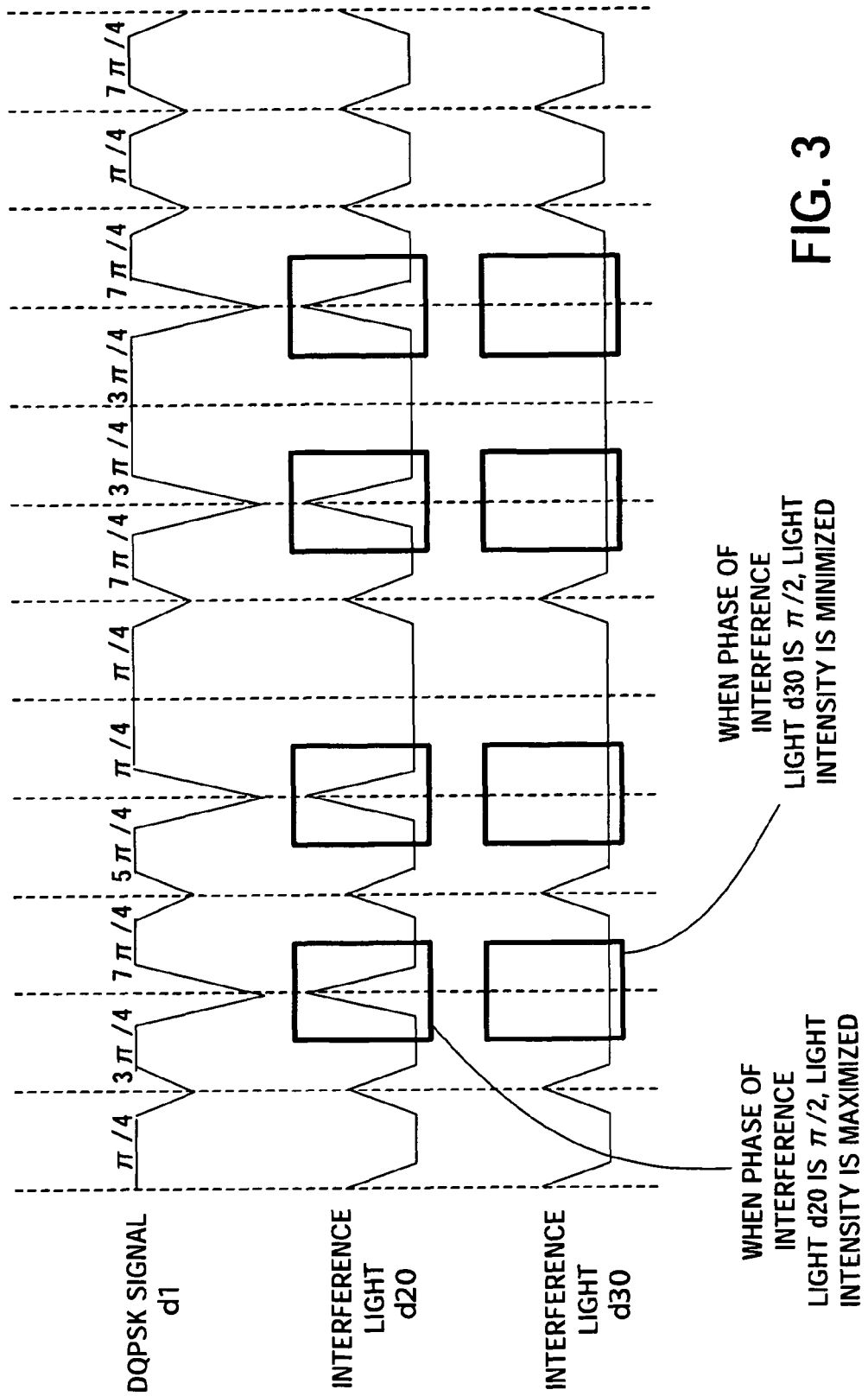
FIG. 3 shows one example of waveforms of a DQPSK signal and monitoring interference lights.

FIG. 3 shows one example of waveforms of the DQPSK signal d1 and the monitoring interference lights d20 and d30. The horizontal axis represents the time and the vertical axis represents the light intensity. The light interference section 20 outputs the DQPSK signal d1 and the monitoring interference lights d20 and d30. In FIG. 3, the DQPSK signal d1 is outputted at a phase such as π/4, 3π/4, 7π/4, 5π/4, π/4, π/4, . . . .

On the other hand, from formula (5), an output intensity of the monitoring interference light d20 is 1 (=cos(π/4−ϕ/2)=cos 0°) in the case of ϕ=π/2. Therefore, the monitoring interference light d20 is outputted as a waveform having the maximum light intensity in the case of ϕ=π/2.

From formula (6), an output intensity of the monitoring interference light d30 is zero (=cos(π/4+ϕ/2)=cos π/2) in the case of ϕ=π/2. Therefore, the monitoring interference light d30 is outputted as a waveform having the minimum light intensity in the case of ϕ=π/2.

Figure 4:
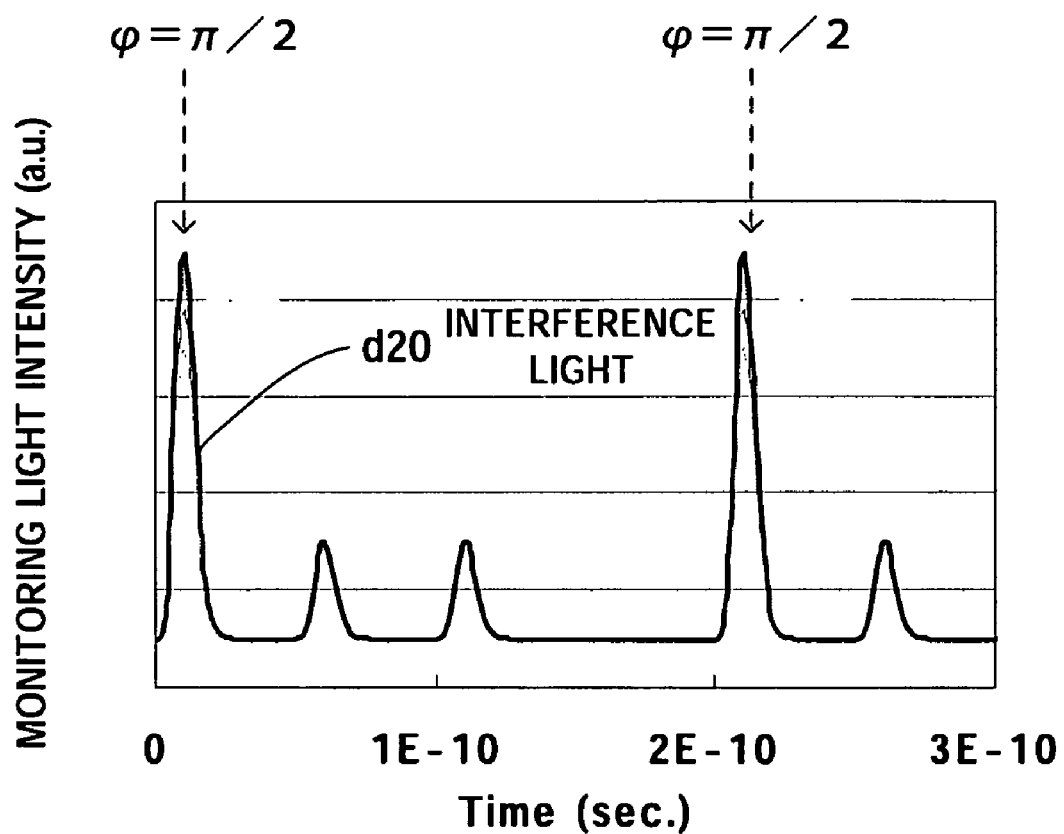
FIG. 4 shows a simulation result of a light intensity of the monitoring interference light.
Figure 5:
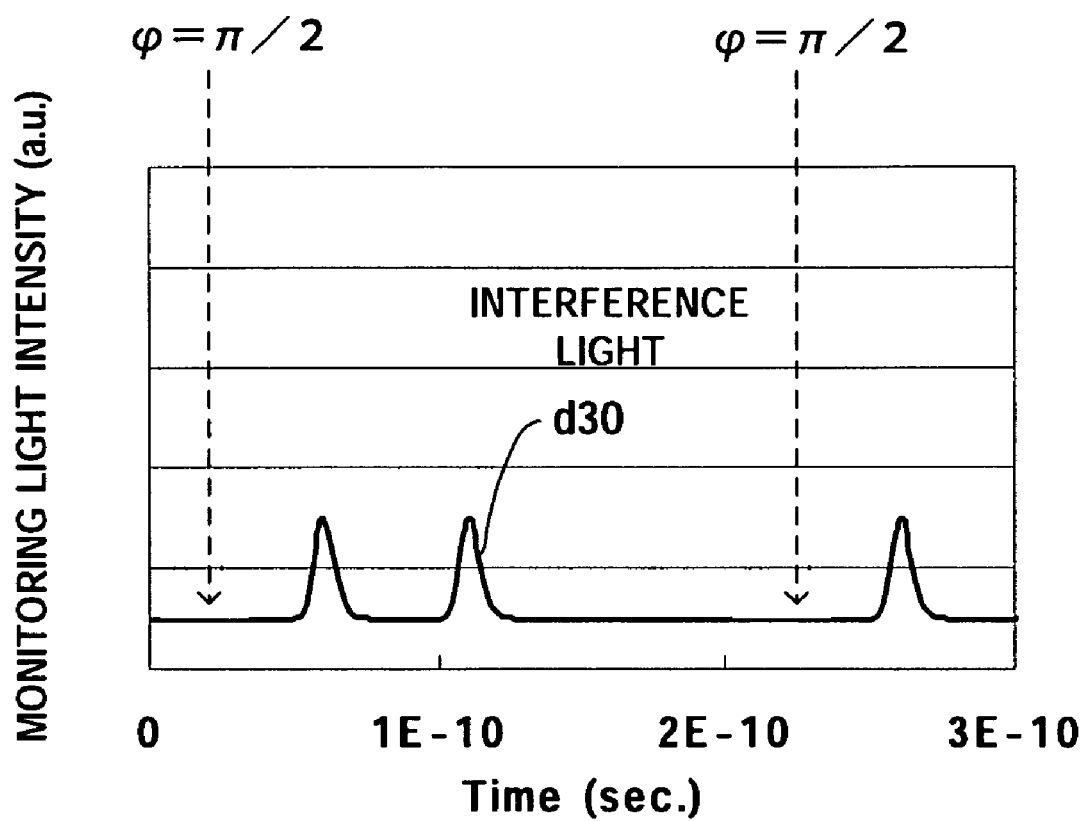
FIG. 5 shows a simulation result showing a light intensity of the monitoring interference light.

FIG. 4 shows simulation results of a light intensity of the monitoring interference light d20 and FIG. 5 shows simulation results of a light intensity of the monitoring interference light d30. The horizontal axis represents the time and the vertical axis represents the light intensity (represents the light intensity when received by the PD 31).

The simulation results show that the monitoring interference light d20 has the maximum light intensity in the case of ϕ=π/2. Further, the simulation results show that the monitoring interference light d30 has the minimum intensity in the case of ϕ=π/2.

Figure 6:
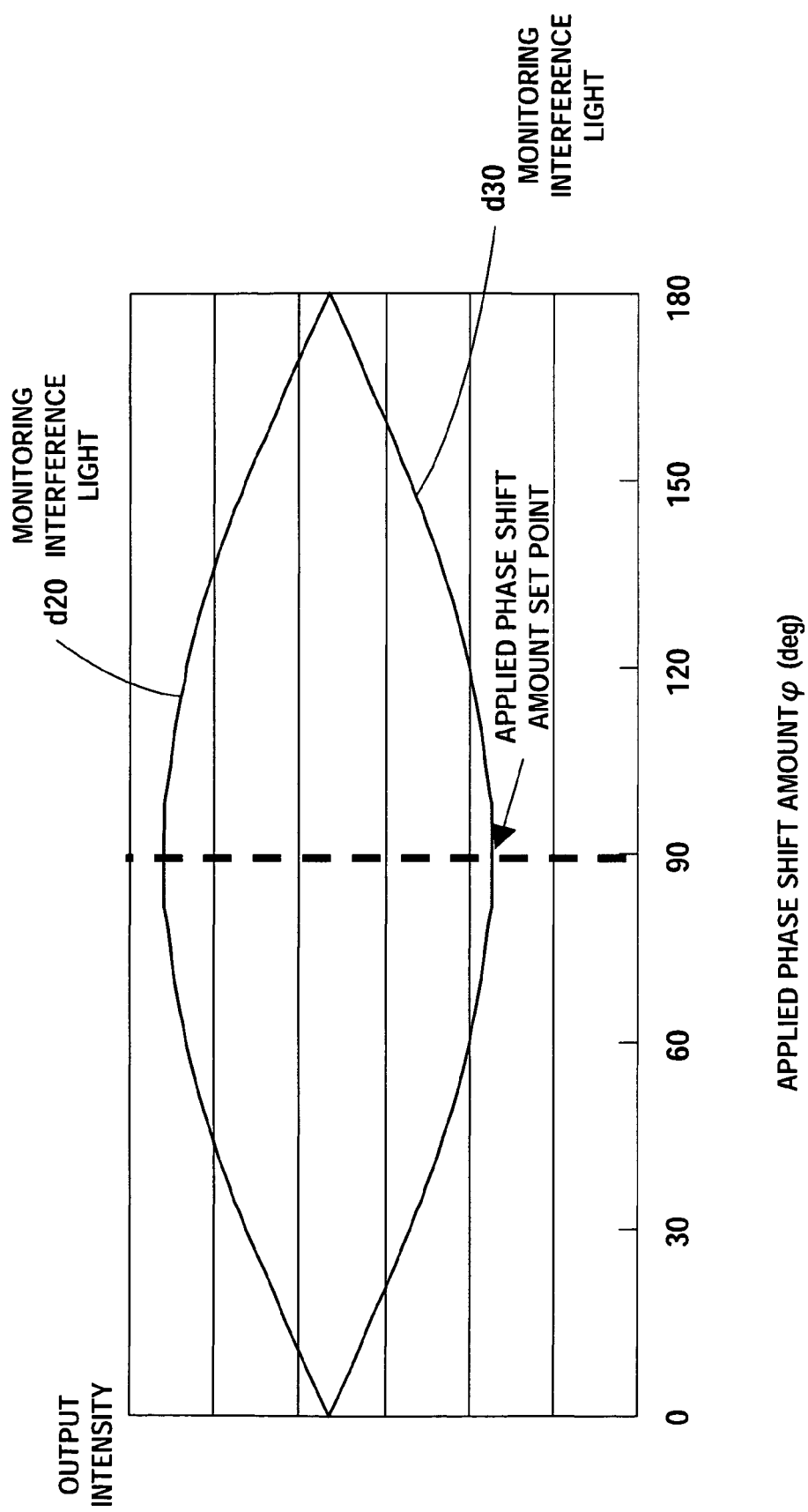
FIG. 6 shows function curves of the monitoring interference lights.

FIG. 6 shows function curves of the monitoring interference lights d20 and d30. The horizontal axis represents the phase ϕ and the vertical axis represents the light intensity. FIG. 6 shows function curves of formulas 5 and 6. In the light modulation device 1, when the DQPSK signal d1 is generated, π/2 is set as the phase shift amount ϕ to be set by the phase shifter 13. As is apparent from FIG. 6 in the case of ϕ=π/2, the light intensity of the monitoring interference light d20 generated by the light interference section 20 is maximized.

Accordingly, the phase shift controller 32 applies a phase control signal to the phase shifter 13 to perform the phase adjustment on the section 13, aiming to cause the light intensity of the monitoring interference light d20 in the PD 31 to be maximized. As a result, a phase difference between the modulated light modulated by the phase modulator 12a and the modulated light modulated by the phase modulator 12b can be always stably kept to be π/2.

In a conventional phase control on a phase shifter, the control is performed such that the light intensity received by the PD is an intermediate value between conditions where the light intensity is maximized and those where the light intensity is minimized. As compared with the above-described control, an optimum point is far more easily detected and can be easily set in the structure of the light modulation device 1. As a result, the phase difference of π/2 can be stabled with high accuracy.

Further, in the light modulation device 1, when the DQPSK signal d1 is generated, π/2 is set as the phase shift amount ϕ to be set by the phase shifter 13. As is apparent from FIG. 6 in the case of ϕ=π/2, the light intensity of the monitoring interference light d30 generated by the light interference section 20 is minimized.

Accordingly, the monitoring interference light d30 can also be used. In this case, the phase shift controller 32 performs the phase adjustment on the phase shifter 13, aiming to cause the light intensity of the monitoring interference light d30 in the PD 31 to be minimized. As a result, a phase difference between the modulated light modulated by the phase modulator 12a and the modulated light modulated by the phase modulator 12b can be always stably kept to be π/2.

Figure 7:
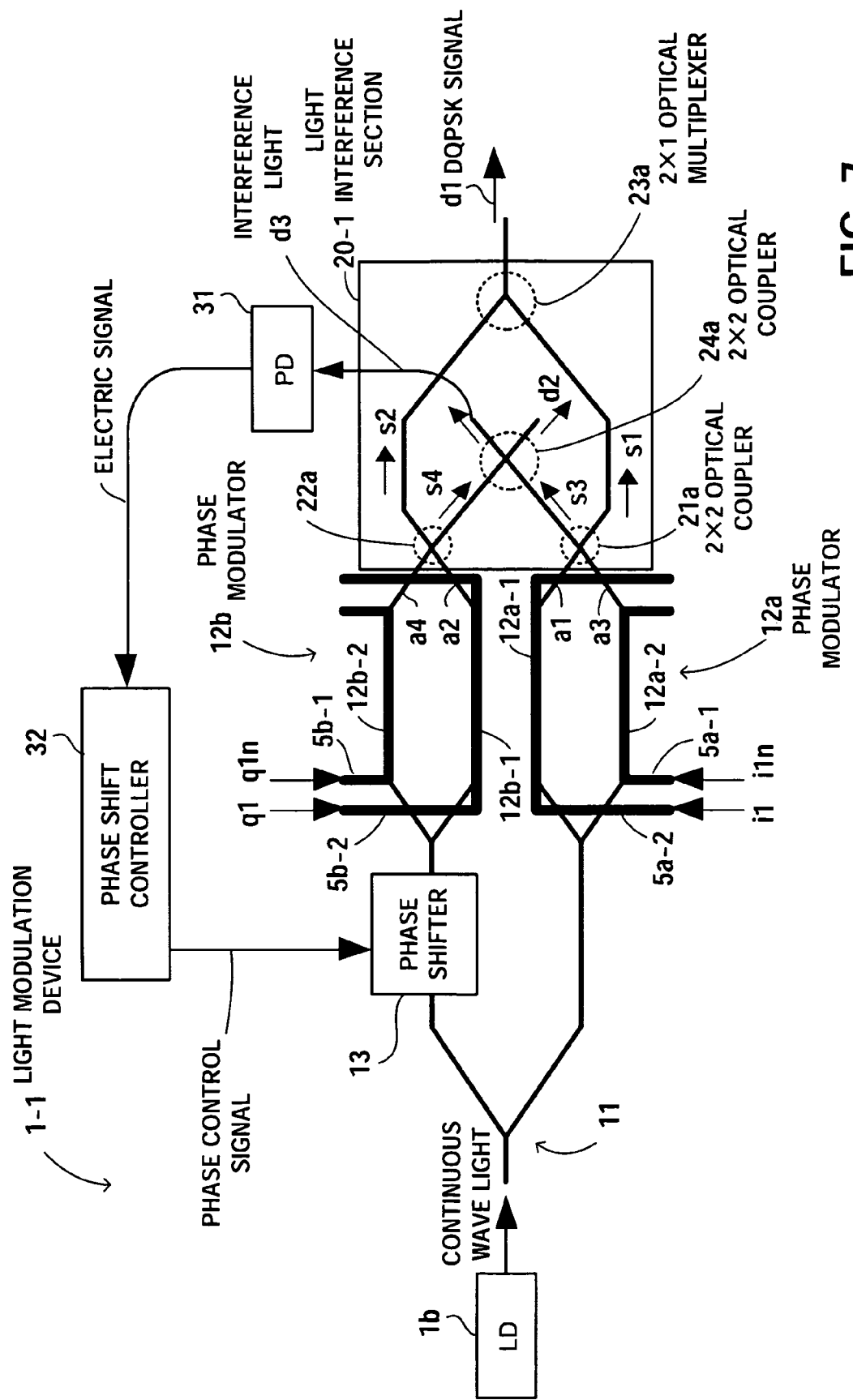
FIG. 7 shows a structure of a light modulation device.

Next, a specific structure of the light modulation device 1 will be described. FIG. 7 shows a structure of a light modulation device 1-1. The light modulation device 1-1 according to a first embodiment comprises the LD 1b, the branching section 11, the phase modulators 12a and 12b, the phase shifter 13, a light interference section 20-1, the PD 31 and the phase shift controller 32. Hereinafter, in FIG. 7, the same elements as those shown in FIG. 2 are indicated by the same reference numerals as in FIG. 2 and the description is omitted.

Figure 8:
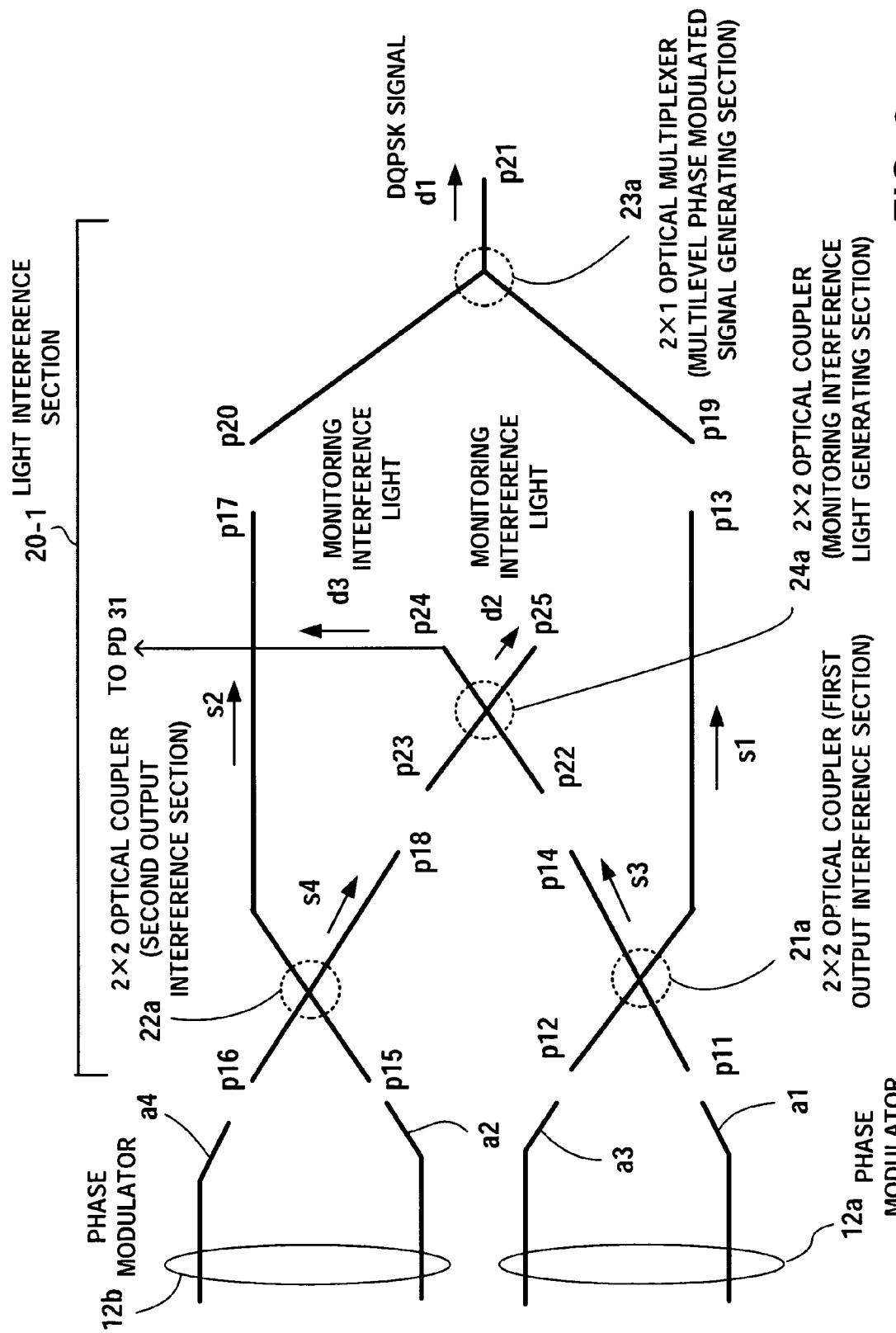
FIG. 8 shows an internal structure and connection relationship of a light interference section.

FIG. 8 illustrates an internal structure and connection relationship in the light interference section 20-1. The light interference section 20-1 includes a 2×2 optical coupler 21a (first output interference section), a 2×2 optical coupler 22a (second output interference section), a 2×1 optical multiplexer 23a (multilevel phase modulated signal generating section) and a 2×2 optical coupler 24a (monitoring interference light generating section).

An arm (arm: an emitting waveguide) a1 of the phase modulator 12a is connected to an input port p11 of the 2×2 optical coupler 21a and an arm a3 of the phase modulator 12a is connected to an input port p12 of the 2×2 optical coupler 21a. An arm a2 of the phase modulator 12b is connected to an input port p15 of the 2×2 optical coupler 22a and an arm a4 of the phase modulator 12b is connected to an input port p16 of the 2×2 optical coupler 22a.

An output port p13 of the 2×2 optical coupler 21a is connected to an input port p19 of the 2×1 optical multiplexer 23a and an output port p14 of the 2×2 optical coupler 21a is connected to an input port p22 of the 2×2 optical coupler 24a.

An output port p17 of the 2×2 optical coupler 22a is connected to an input port p20 of the 2×1 optical multiplexer 23a and an output port p18 of the 2×2 optical coupler 22a is connected to an input port p23 of the 2×2 optical coupler 24a. An output port p24 of the 2×2 optical coupler 24a is connected to the PD 31 (an output port p25 of the 2×2 optical coupler 24a may be connected to the PD 31).

Here, the modulated lights outputted from the arms a1 and a3 of the phase modulator 12a are inputted to the 2×2 optical coupler 21a and caused to interfere with each other by the coupler 21a. Thereby, a modulated light s1 (first modulated light) is outputted from the output port p13 of the 2×2 optical coupler 21a and an emitted light s3 (first emitted light) is outputted from the output port p14 of the 2×2 optical coupler 21a.

Further, the modulated lights outputted from the arms a2 and a4 of the phase modulator 12b are inputted to the 2×2 optical coupler 22a and caused to interfere with each other by the coupler 22a. Thereby, a modulated light s2 (second modulated light) is outputted from the output port p17 of the 2×2 optical coupler 22a and an emitted light s4 (second emitted light) is outputted from the output port p18 of the 2×2 optical coupler 22a.

The modulated lights 81 and s2 are inputted to the 2×1 optical multiplexer 23a and multiplexed by the section 23a. Thereby, the DQPSK signal d1 is generated and outputted from the output port p21 of the 2×1 optical multiplexer 23a. The emitted lights s3 and s4 are inputted to the 2×2 optical coupler 24a and caused to interfere with each other by the coupler 24a. Thereby, a monitoring interference light d3 is outputted from the output port p24 of the 2×2 optical coupler 24a and a monitoring interference light d2 is outputted from the output port p25 of the 2×2 optical coupler 24a.

Figure 9:
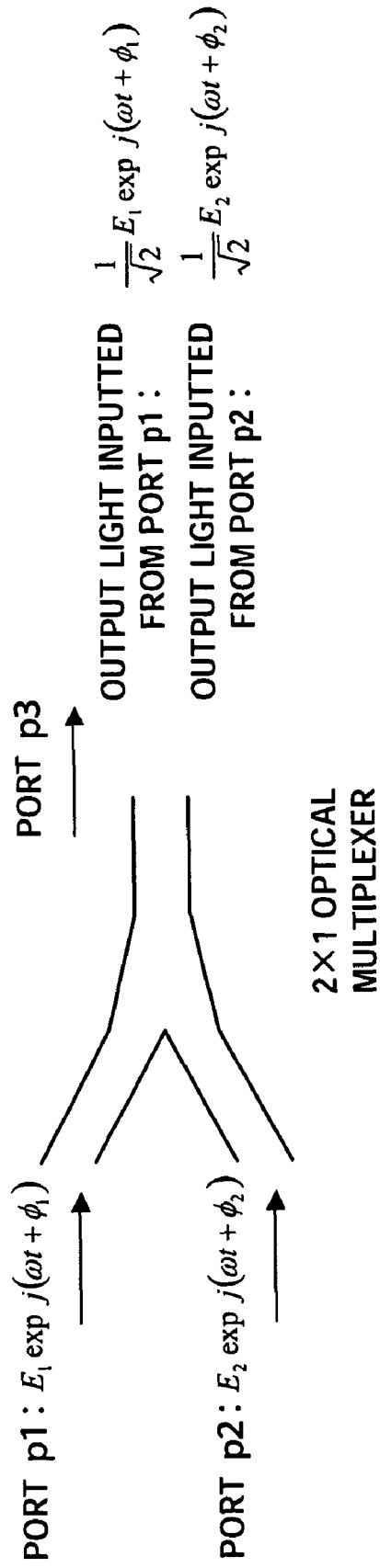
FIG. 9 shows characteristics of a 2×1 optical multiplexer.

Next, characteristics of the 2×1 optical multiplexer will be described. FIG. 9 shows characteristics of the 2×1 optical multiplexer. FIG. 10 shows a phase relationship between input light and output light of the 2×1 optical multiplexer.

As the phase characteristics of the 2×1 optical multiplexer, even if a optical signal is inputted from a port p1 and outputted from a port p3, a phase difference is equal to zero. For example, when the input light $(E_1 \exp j(\omega t + \phi_1))$ is inputted from the port p1, the output light $((\frac{1}{2}^{1/2}) \cdot E_1 \exp j(\omega t + \phi_1))$ is outputted from the port p3. Accordingly, no phase difference is generated between the optical signals before and after passing through the 2×1 optical multiplexer.

Even if an optical signal is inputted from the port p2 of the 2×1 optical multiplexer and outputted from the port p3, a phase difference is equal to zero. For example, when the input light $(E_2 \exp j(\omega t + \phi_2))$ is inputted from the port p2, the output light $((\frac{1}{2}^{1/2}) \cdot E_2 \exp j(\omega t + \phi_2))$ is outputted from the port p3. Accordingly, no phase difference is generated between the optical signals before and after passing through the 2×1 optical multiplexer.

Figure 11:
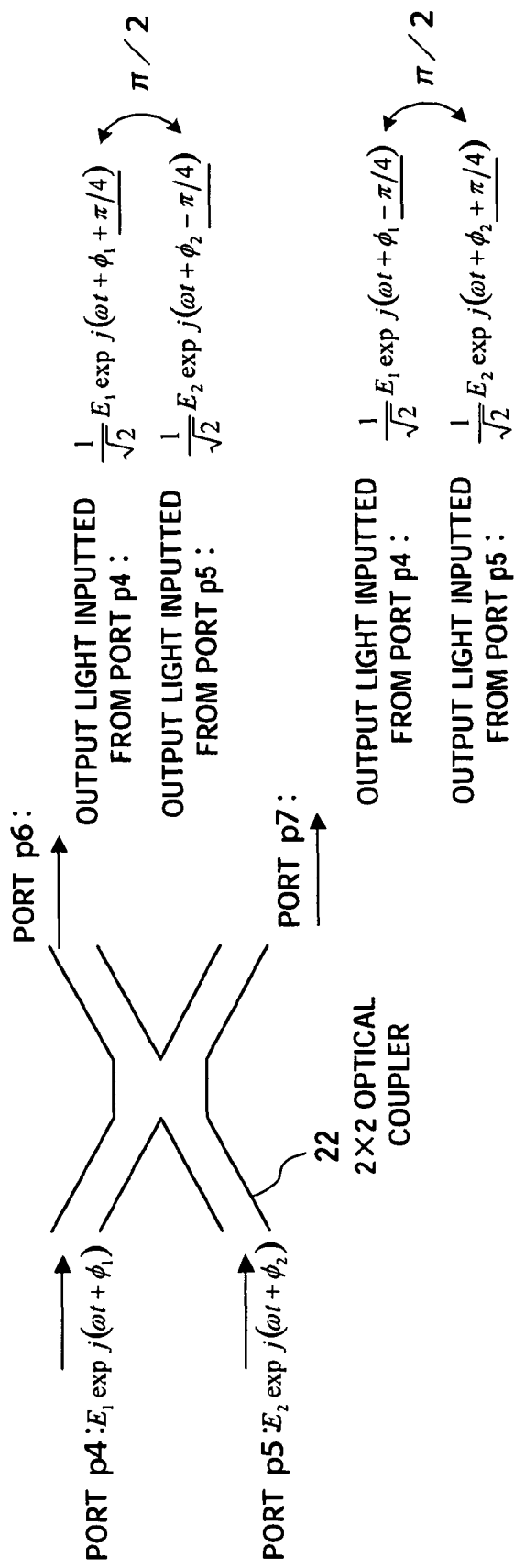
FIG. 11 shows characteristics of a 2×2 optical coupler.

Next, characteristics of the 2×2 optical coupler will be described. FIG. 11 shows characteristics of the 2×2 optical coupler. FIG. 12 shows a phase relationship between input light and output light of the 2×2 optical coupler.

As the phase characteristics of the 2×2 optical coupler, when an optical signal is inputted from a port p4 and outputted from a port p6, a phase difference of $+\pi/4$ is generated. For example, when the input light $(E_1 \exp j(\omega t + \phi_1))$ is inputted from the port p4, the outputted light $((\frac{1}{2}^{1/2}) \cdot E_1 \exp j(\omega t + \phi_1 + \pi/4))$ is outputted from the port p6.

Further, when an optical signal is inputted from a port p5 and outputted from the port p6, a phase difference of $-\pi/4$ is generated. For example, when the input light $(E_2 \exp j(\omega t + \phi_2))$ is inputted from the port p5, the output light $((\frac{1}{2}^{1/2}) \cdot E_2 \exp j(\omega t + \phi_2 - \pi/4))$ is outputted from the port p6. Accordingly, a phase difference of $\pi/2$ (the phase shift amount between $(+\pi/4)$ and $(-\pi/4)$ is equal to $\pi/2$) exists between a light passing from the port p4 to the port p6 and a light passing from the port p5 to the port p6.

On the other hand, when an optical signal is inputted from the port p4 and outputted from the port p7 of the 2×2 optical coupler, a phase difference of $-\pi/4$ is generated. For example, when the input light $(E_1 \exp j(\omega t + \phi_1))$ is inputted from the port p4, the output light $((\frac{1}{2}^{1/2}) E_1 \exp j(\omega t + \phi_1 - \pi/4))$ is outputted from the port p7.

Further, when an optical signal is inputted from the port p5 and outputted from the port p7, a phase difference of $+\pi/4$ is generated. For example, when the input light $(E_2 \exp j(\omega t + \phi_2))$ is inputted from the port p5, the output light $((\frac{1}{2}^{1/2}) \cdot E_2 \exp j(\omega t + \phi_2 + \pi/4))$ is outputted from the port p7. Accordingly, a phase difference of $\pi/2$ exists between a light passing from the port p4 to the port p7 and a light passing from the port p5 to the port p7.

Next, a flow and phase change of optical signals in the inside of the light interference section 20-1 will be described. The modulated light s1 outputted from the output port p13 of the 2×2 optical coupler 21a is inputted to the input port p19 of the 2×1 optical multiplexer 23a. The modulated light s2 outputted from the output port p17 of the 2×2 optical coupler 22a is inputted to the input port p20 of the 2×1 optical multiplexer 23a. Then, the modulated lights s1 and s2 which are phase-shifted from each other by $\pi/2$ (this shift of $\pi/2$ is applied by the phase shifter 13) are multiplexed by the 2×1 optical multiplexer 23a, and the DQPSK signal d1 is outputted from the output port p21.

On the other hand, the emitted light s3 outputted from the output port p14 of the 2×2 optical coupler 21a is inputted to the input port p22 of the 2×2 optical coupler 24a. The emitted light s4 outputted from the output port p18 of the 2×2 optical coupler 22a is inputted to the input port p23 of the 2×2 optical coupler 24a.

Then, the emitted lights s3 and s4 which are phase-shifted from each other by $\pi/2$ (this shift of $\pi/2$ is applied by the phase shifter 13) are caused to interfere with each other by the 2×2 optical coupler 24a, and the monitoring interference light d3 having a phase shifted by $\pi/2$ with respect to that of the DQPSK signal d1 is outputted from the output port p24. The reason why the monitoring interference light d3 has a phase shifted by $\pi/2$ with respect to that of the DQPSK signal d1 is that a phase difference of $\pi/2$ is newly generated by causing the emitted lights s3 and s4 to interfere with each other by the coupler 24a.

Also from the output port p25, the monitoring interference light d2 having a phase shifted by $\pi/2$ with respect to that of the DQPSK signal d1 is outputted. The reason why the monitoring interference light d2 has a phase shifted by $\pi/2$ with respect to that of the DQPSK signal d1 is that a phase difference of $\pi/2$ is newly generated by causing the emitted lights s3 and s4 to interfere with each other by the coupler 24a. When the monitoring interference light d2 is phase-shifted by $\pi/2$, for example, in the positive direction with respect to the DQPSK signal d1, the monitoring interference light d3 is phase-shifted by $\pi/2$ in the negative direction with respect to the DQPSK signal d1. Accordingly, phases of the monitoring interference lights d2 and d3 are shifted in the opposite direction from each other.

Assuming here that $E_0$ is the amplitude and $\phi$ is the phase shift amount set by the phase shifter 13, the emitted light s3 is represented by formula (7), the emitted light s4 is represented by formula (8), the monitoring interference light d2 is represented by formula (9), and the monitoring interference light d3 is represented by formula (10). The modulated lights s1 and s2 are represented by the above-described formulas 2 and 3. The DQPSK signal d1 is represented by the above-described formula (4).

$$s3 = \frac{1}{\sqrt{2}} E_0 \exp j(\omega t) \tag{7}$$

$$s4 = \frac{1}{\sqrt{2}} E_0 \exp j(\omega t + \phi) \tag{8}$$

$$d2 = \frac{1}{\sqrt{2}} E_0 \exp j(\omega t + \pi/4) + \frac{1}{\sqrt{2}} E_0 \exp j(\omega t + \phi - \pi/4) \tag{9}$$
$$= \cos(\pi/4 - \phi/2) E_0 \exp j(\omega t + \phi/2)$$

$$d3 = \frac{1}{\sqrt{2}} E_0 \exp j(\omega t + \pi/4) + \frac{1}{\sqrt{2}} E_0 \exp j(\omega t + \phi + \pi/4) \tag{10}$$
$$= \cos(\pi/4 + \phi/2) E_0 \exp j(\omega t + \phi/2)$$

In formula (9), $+\pi/4$ in the first term and $-\pi/4$ in the second term represent a phase change generated by causing the emitted lights s3 and s4 to pass through the 2×2 optical coupler 24a. In formula (10), $-\pi/4$ in the first term and $+\pi/4$ in the second term represent a phase change generated by causing the emitted lights s3 and s4 to pass through the 2×2 optical coupler 24a.

Figure 13:
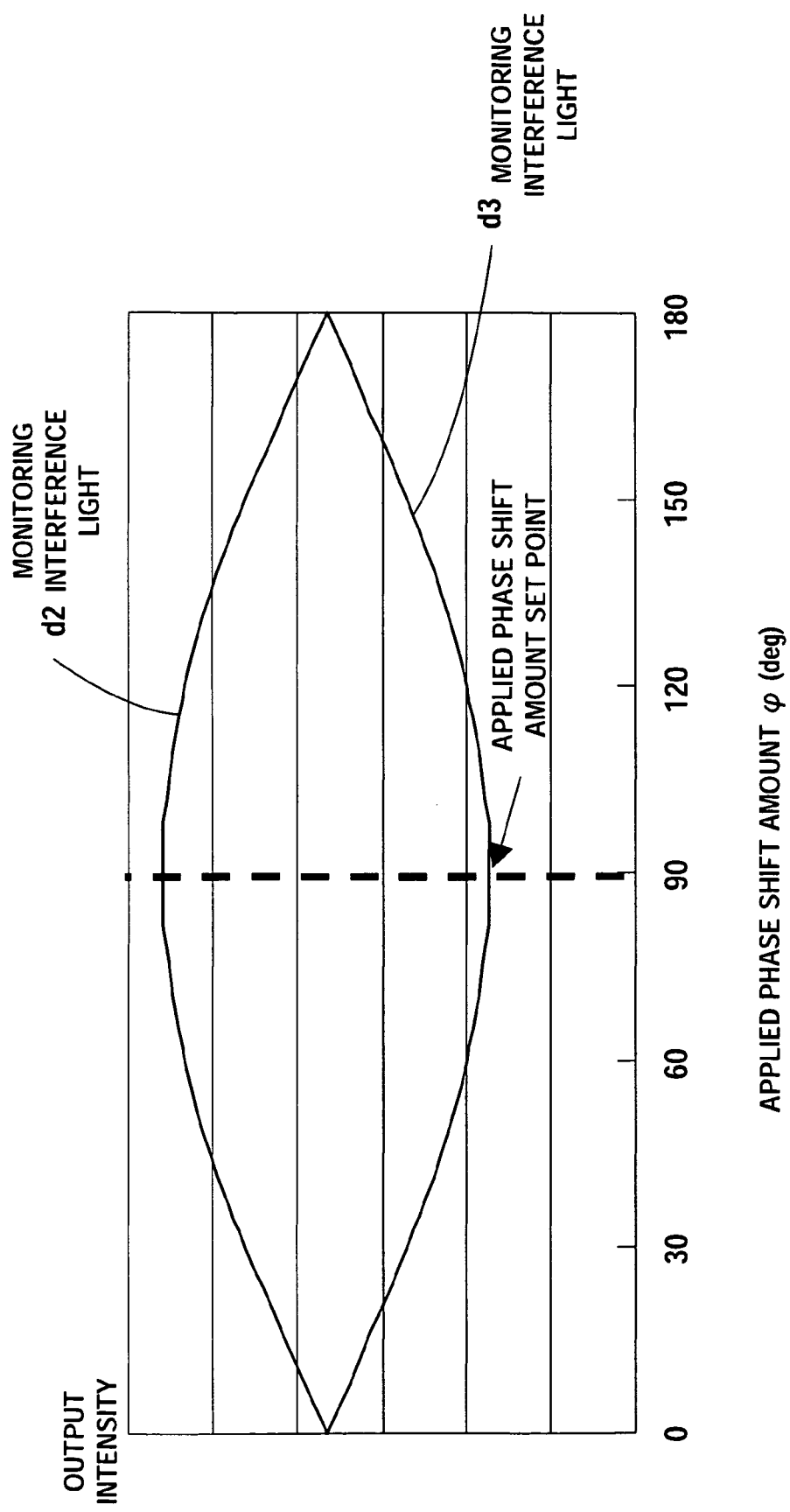
FIG. 13 shows function curves of monitoring interference lights.

FIG. 13 shows function curves of the monitoring interference lights d2 and d3. The horizontal axis represents the phase (the applied phase shift amount) $\phi$ and the vertical axis represents the light intensity. FIG. 13 shows function curves of the monitoring interference light d2 represented by formula (9) and of the monitoring interference light d3 represented by formula (10).

The monitoring interference light d2 is phase-shifted by $\pi/2$ with respect to the DQPSK signal d1. Accordingly, the monitoring interference light d2 has, when its own phase is $\pi/2$, the same waveform as that of the DQPSK signal d1 having the maximum intensity, as is apparent in comparison with the above-described FIG. 27. That is, the monitoring interference light d2 is signal light having a phase shifted by $\pi/2$ with respect to that of the DQPSK signal d1 and having the maximum intensity when its own phase is $\pi/2$.

On the other hand, the monitoring interference light d3 is phase-shifted by $\pi/2$ in the opposite direction with respect to the DQPSK signal d1. When the monitoring interference light d2 is phase-shifted by $\pi/2$ in the positive direction with respect to the DQPSK signal d1, the monitoring interference light d3 is phase-shifted by $\pi/2$ in the negative direction with respect to the DQPSK signal d1.

Figure 27:
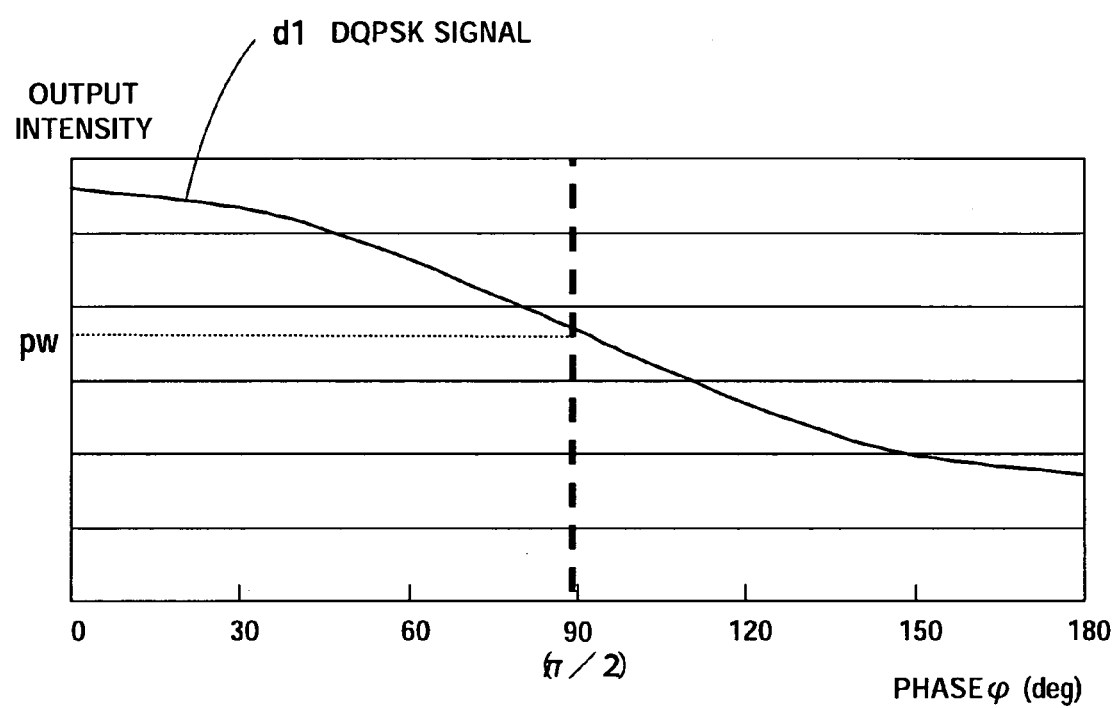
FIG. 27 shows the DQPSK signal.

Accordingly, the monitoring interference light d3 has, when its own phase is $\pi/2$, the same waveform as that of the DQPSK signal d1 having the minimum intensity, as is apparent in comparison with the above-described FIG. 27. That is, the monitoring interference light d3 is signal light having a phase shifted by $\pi/2$ with respect to that of the DQPSK signal d1 and having the minimum intensity when its own phase is $\pi/2$.

Figure 14:
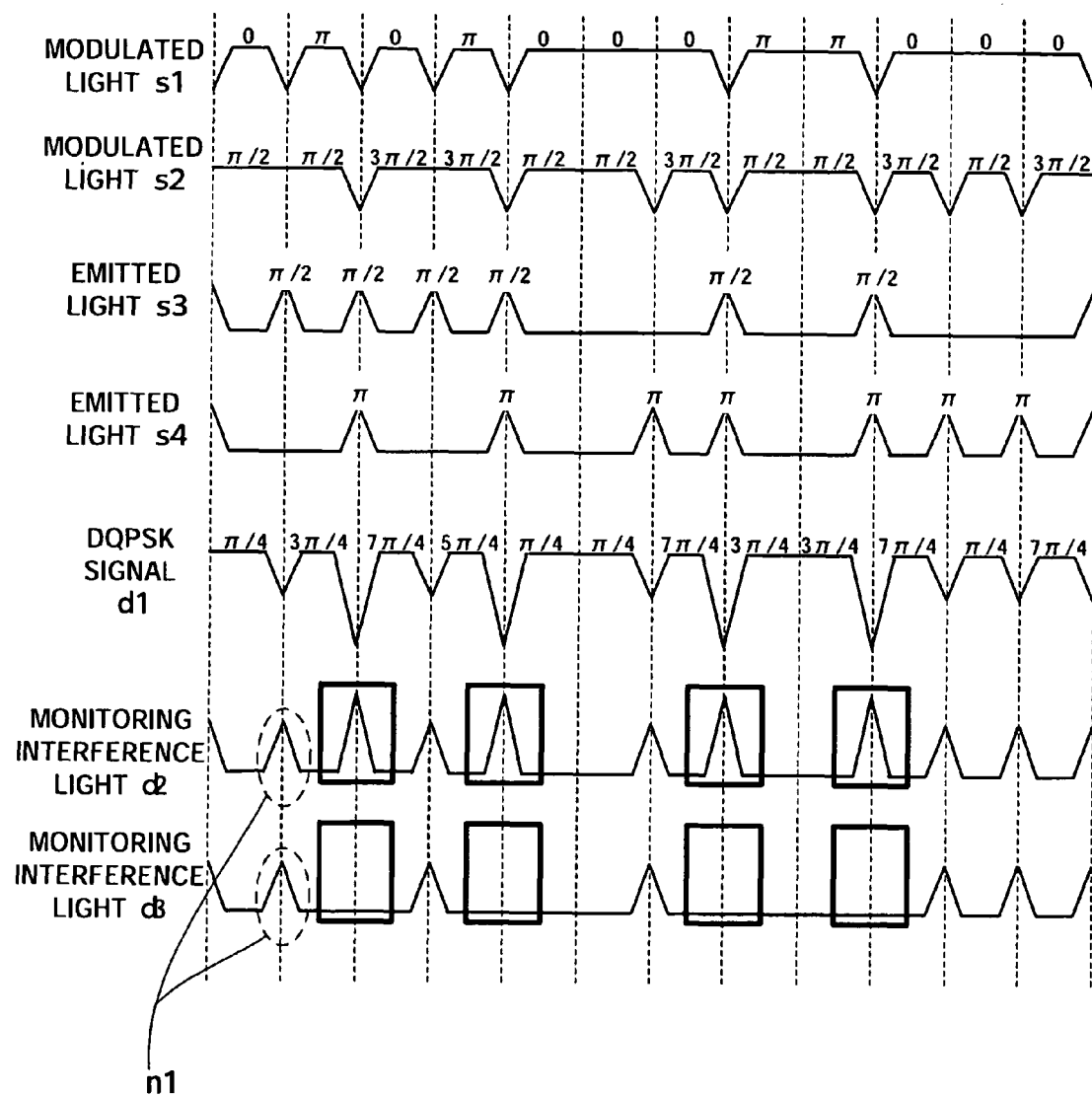
FIG. 14 shows one example of waveforms of the DQPSK signal and the monitoring interference lights.

FIG. 14 shows one example of waveforms of the DQPSK signal d1 and the monitoring interference lights d2 and d3. The horizontal axis represents the time and the vertical axis represents the light intensity. From formula (9), in the case of $\phi=\pi/2$, an output intensity $(\cos(\pi/4-\phi/2))$ of the monitoring interference light d2 is 1. Therefore, in the case of $\phi=\pi/2$, the monitoring interference light d2 is outputted as a waveform with the maximum intensity.

From formula (10), an output intensity $(\cos(\pi/4+\phi/2))$ of the monitoring interference light d3 is zero when the phase shift amount is $\pi/2$. Therefore, the monitoring interference light d3 is outputted as a waveform having the minimum intensity when the phase shift amount is $\pi/2$ (a sign n1 of FIG. 14 will be described later).

Figure 15:
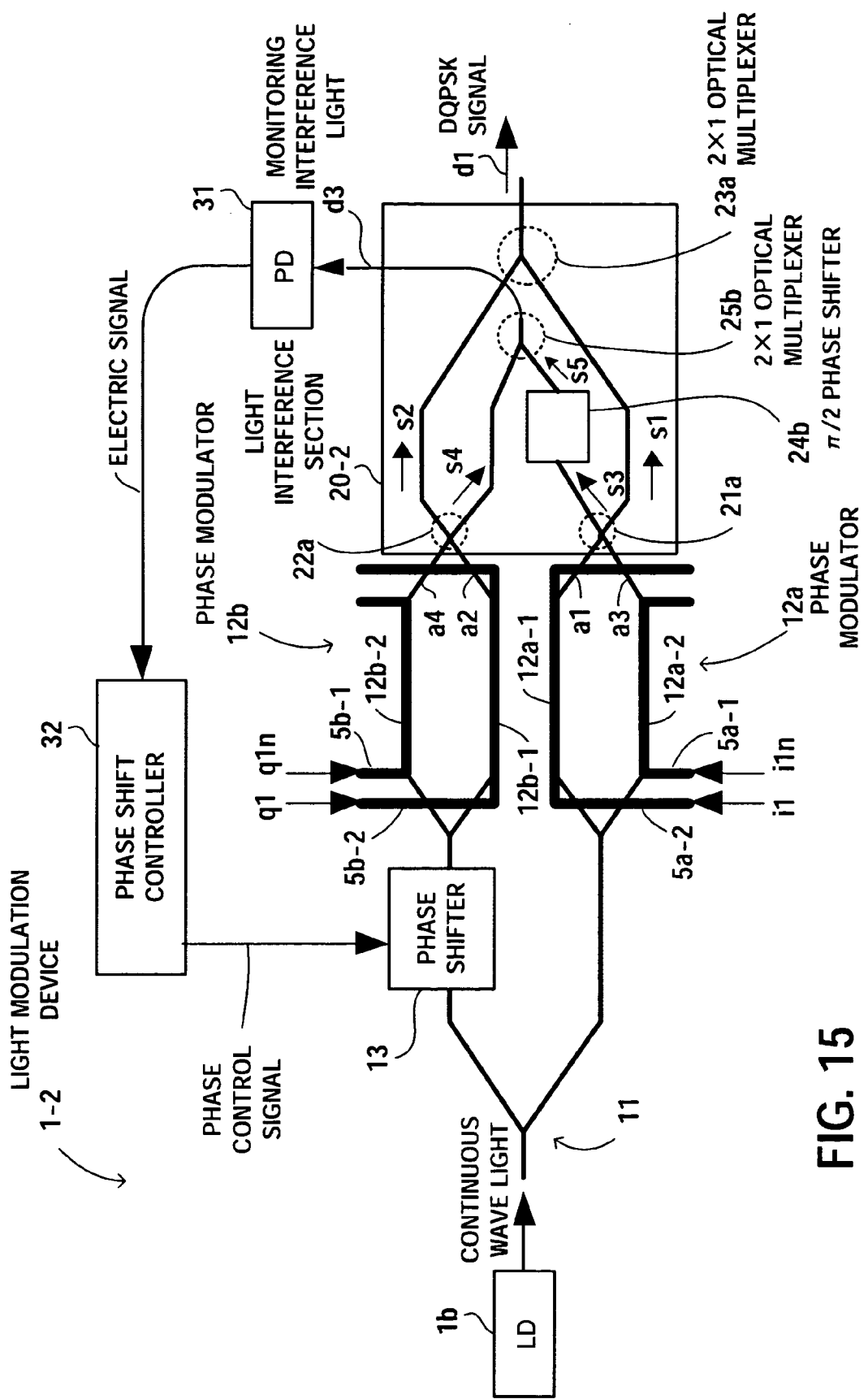
FIG. 15 shows a structure of a light modulation device.

Next, a light modulation device according to a second embodiment will be described. FIG. 15 shows a structure of the light modulation device. A light modulation device 1-2 according to the second embodiment comprises the LD 1b, the branching section 11, the phase modulators 12a and 12b, the phase shifter 13, a light interference section 20-2, the PD 31 and the phase shift controller 32.

Figure 16:
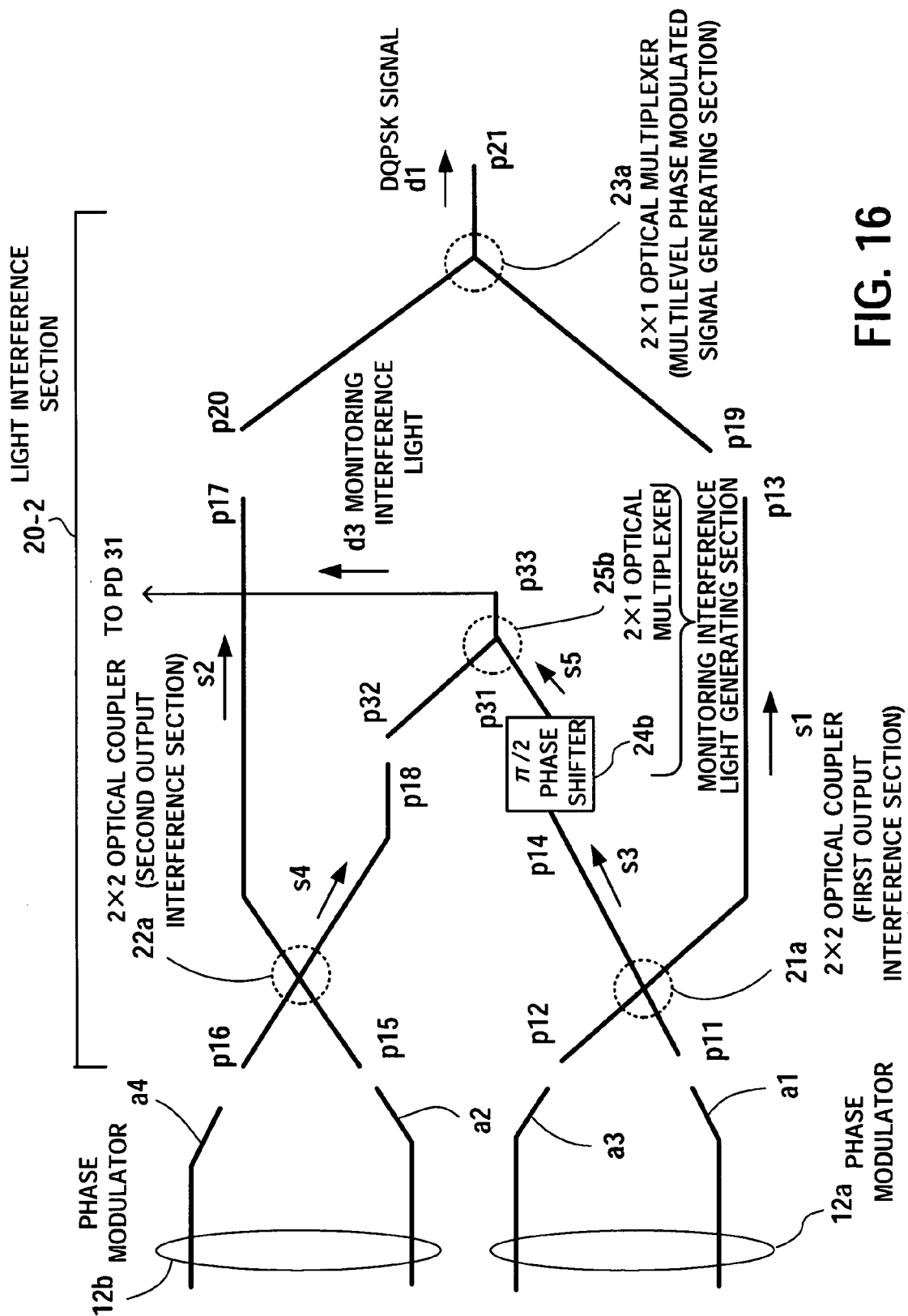
FIG. 16 shows an internal structure and connection relationship of a light interference section.

FIG. 16 illustrates an internal structure and connection relationship in the light interference section 20-2. The light interference section 20-2 includes the 2×2 optical coupler 21a (first output interference section), the 2×2 optical coupler 22a (second output interference section), the 2×1 optical multiplexer 23a (multilevel phase modulated signal generating section), a $\pi/2$ phase shifter 24b ($\phi$ phase shifter) and a 2×1 optical multiplexer 25b (the $\pi/2$ phase shifter 24b and the 2×1 optical multiplexer 25b correspond to the monitoring interference light generating section).

The arm a1 of the phase modulator 12a is connected to the input port p11 of the 2×2 optical coupler 21a and the arm a3 of the phase modulator 12a is connected to an input port p12 of the 2×2 optical coupler 21a. The arm a2 of the phase modulator 12b is connected to the input port p15 of the 2×2 optical coupler 22a and the arm a4 of the phase modulator 12b is connected to the input port p16 of the 2×2 optical coupler 22a.

The output port p13 of the 2×2 optical coupler 21a is connected to the input port p19 of the 2×1 optical multiplexer 23a. The output port p14 of the 2×2 optical coupler 21a is connected to an input port of the $\pi/2$ phase shifter 24b. An output port of the $\pi/2$ phase shifter 24b is connected to an input port p31 of the 2×1 optical multiplexer 25b.

The output port p17 of the 2×2 optical coupler 22a is connected to the input port p20 of the 2×1 optical multiplexer 23a and the output port p18 of the 2×2 optical coupler 22a is connected to an input port p32 of the 2×1 optical multiplexer 25b. An output port p33 of the 2×1 optical multiplexer 25b is connected to the PD 31.

Here, the modulated lights outputted from the arms a1 and a3 of the phase modulator 12a are inputted to the 2×2 optical coupler 21a and caused to interfere with each other by the coupler 21a. Thereby, the modulated light s1 is outputted from the output port p13 of the 2×2 optical coupler 21a and the emitted light s3 is outputted from the output port p14 of the 2×2 optical coupler 21a.

Further, the modulated lights outputted from the arms a2 and a4 of the phase modulator 12b are inputted to the 2×2 optical coupler 22a and caused to interfere with each other by the coupler 22a. Thereby, the modulated light s2 is outputted from the output port p17 of the 2×2 optical coupler 22a and the emitted light s4 is outputted from the output port p18 of the 2×2 optical coupler 22a. The modulated lights s1 and s2 are inputted to the 2×1 optical multiplexer 23a and multiplexed by the section 23a. Thereby, the DQPSK signal d1 is generated and outputted from the output port p21 of the 2×1 optical multiplexer 23a.

The emitted light s3 outputted from the output port p14 of the 2×2 optical coupler 21a is phase-shifted by $\pi/2$ by the $\pi/2$ phase shifter 24b and inputted to the 2×1 optical multiplexer 25b. The 2×1 optical multiplexer 25b multiplexes the emitted light s4 outputted from the output port p18 of the 2×2 optical coupler 22a and an output light s5 outputted from the $\pi/2$ phase shifter 24b, which is phase-shifted by $\pi/2$ with respect to the emitted light s4. Then, from the output port p33, the section 25b outputs the monitoring interference light d3 phase-shifted by $\pi/2$ with respect to the DQPSK signal d1.

Thus, in the second embodiment, the 2×2 optical coupler 24a shown in the first embodiment is constituted by the $\pi/2$ phase shifter 24b and the 2×1 optical multiplexer 25b. Thereby, the same functions as those in the first embodiment can be achieved.

More specifically, in place of the 2×2 optical coupler 24a according to the first embodiment, the $\pi/2$ phase shifter 24b is used to generate a phase difference of $\pi/2$, and the output stage of the monitoring interference light is constituted by the 2×1 optical multiplexer 25b in which no phase difference is generated.

Figure 17:
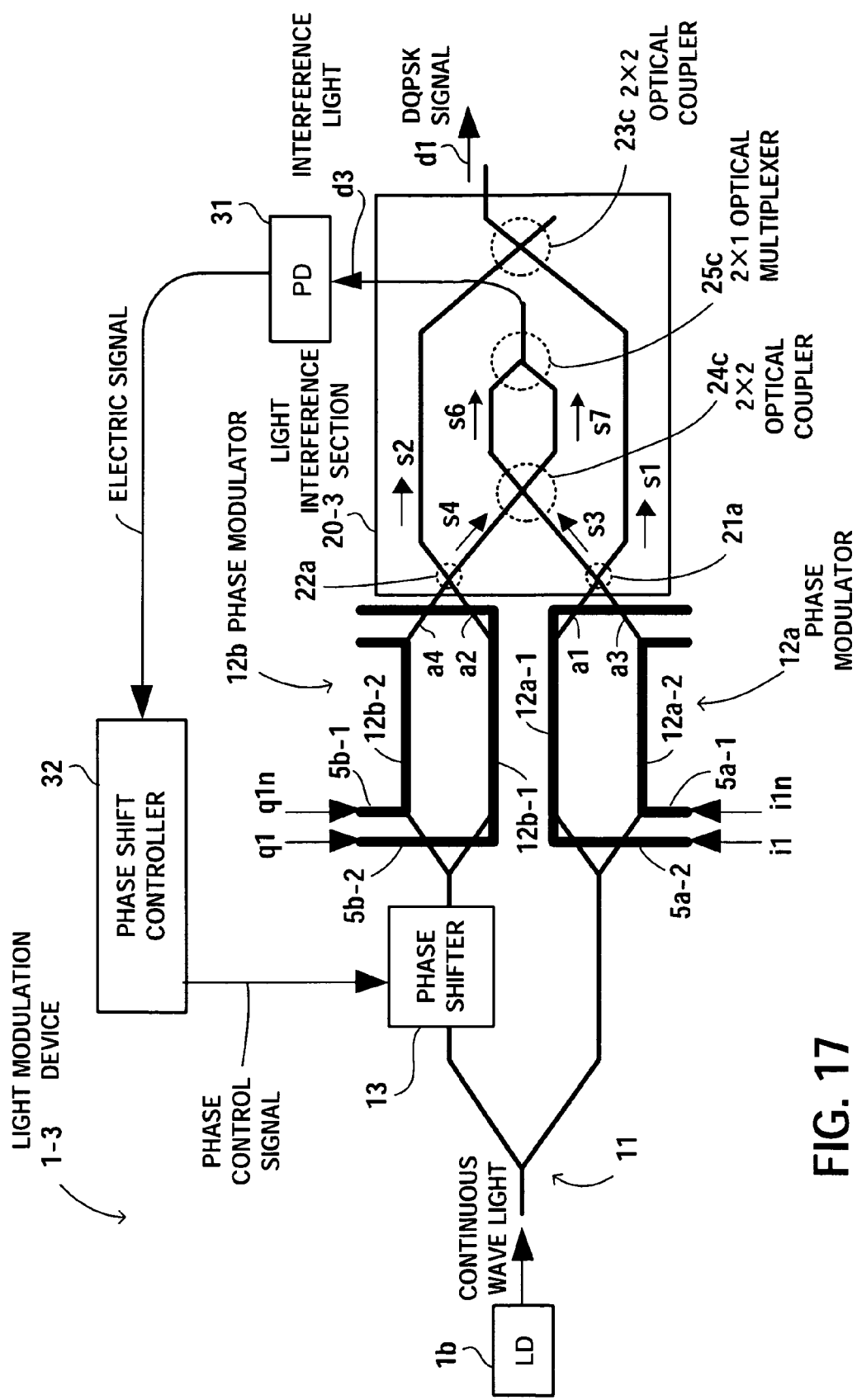
FIG. 17 shows a structure of a light modulation device.

Next, a light modulation device according to a third embodiment will be described. FIG. 17 shows a structure of the light modulation device. A light modulation device 1-3 according to the third embodiment comprises the LD 1b, the branching section 11, the phase modulators 12a and 12b, the phase shifter 13, a light interference section 20-3, the PD 31 and the phase shift controller 32.

Figure 18:
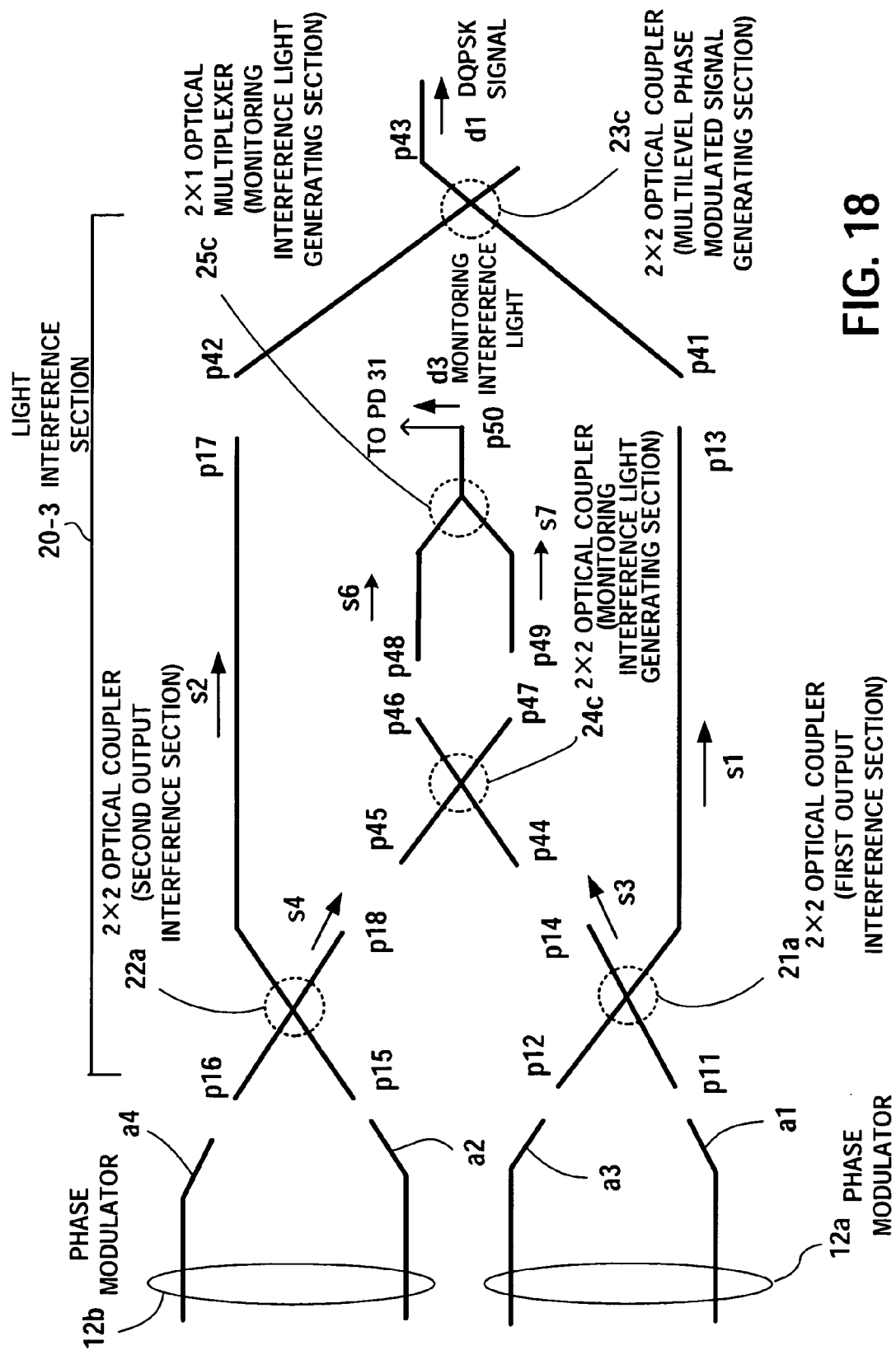
FIG. 18 shows an internal structure and connection relationship in a light interference section.

FIG. 18 illustrates an internal structure and connection relationship in the light interference section 20-3. The light interference section 20-3 includes the 2×2 optical coupler 21a (first output interference section), the 2×2 optical coupler 22a (second output interference section), a 2×2 optical coupler 23c (multilevel phase modulated signal generating section), a 2×2 optical coupler 24c and a 2×1 optical multiplexer 25c (the 2×2 optical coupler 24c and the 2×1 optical multiplexer 25c correspond to the monitoring interference light generating section).

The arm a1 of the phase modulator 12a is connected to the input port p11 of the 2×2 optical coupler 21a and the arm a3 of the phase modulator 12a is connected to the input port p12 of the 2×2 optical coupler 21a. The arm a2 of the phase modulator 12b is connected to the input port p15 of the 2×2 optical coupler 22a and the arm a4 of the phase modulator 12b is connected to the input port p16 of the 2×2 optical coupler 22a.

The output port p13 of the 2×2 optical coupler 21a is connected to an input port p41 of the 2×2 optical coupler 23c and the output port p14 of the 2×2 optical coupler 21a is connected to an input port p44 of the 2×2 optical coupler 24c. The output port p17 of the 2×2 optical coupler 22a is connected to an input port p42 of the 2×2 optical coupler 23c and the output port p18 of the 2×2 optical coupler 22a is connected to an input port p45 of the 2×2 optical coupler 24c.

An output port p46 of the 2×2 optical coupler 24c is connected to an input port p48 of the 2×1 optical multiplexer 25c and an output port p47 of the 2×2 optical coupler 24c is connected to an input port p49 of the 2×1 optical multiplexer 25c. An output port p50 of the 2×1 optical multiplexer 25c is connected to the PD 31.

Here, the modulated lights outputted from the arms a1 and a3 of the phase modulator 12a are inputted to the 2×2 optical coupler 21a and caused to interfere with each other by the coupler 21a. Thereby, the modulated light s1 is outputted from the output port p13 of the 2×2 optical coupler 21a and the emitted light s3 is outputted from the output port p14 of the 2×2 optical coupler 21a.

Further, the modulated lights outputted from the arms a2 and a4 of the phase modulator 12b are inputted to the 2×2 optical coupler 22a and caused to interfere with each other by the coupler 22a. Thereby, the modulated light s2 is outputted from the output port p17 of the 2×2 optical coupler 22a and the emitted light s4 is outputted from the output port p18 of the 2×2 optical coupler 22a. The modulated lights s1 and s2 are inputted to the 2×2 optical coupler 23c and caused to interfere with each other by the coupler 23c and thereby, the DQPSK signal d1 is generated and outputted from the output port p43 of the 2×2 optical coupler 23c.

On the other hand, the emitted light s3 outputted from the output port p14 of the 2×2 optical coupler 21a is inputted to the input port p44 of the 2×2 optical coupler 24c. The emitted light s4 outputted from the output port p18 of the 2×2 optical coupler 22a is inputted to the input port p45 of the 2×2 optical coupler 24c.

Then, the emitted lights s3 and s4 which are phase-shifted from each other by $\pi/2$ are caused to interfere with each other by the 2×2 optical coupler 24c, and signal light s6 is outputted from the output port p46 and signal light s7 is outputted from the output port p47.

Further, the signal light s6 is inputted to the input port p48 of the 2×1 optical multiplexer 25c and the signal light s7 is inputted to the input port p49 of the 2×1 optical multiplexer 25c. Thereby, the monitoring interference light d3 having a phase shifted by $\pi/2$ with respect to that of the DQPSK signal d1 is outputted from the output port p50. The reason why the monitoring interference light d3 has a phase shifted by $\pi/2$ with respect to that of the DQPSK signal d1 is that a phase difference of $\pi/2$ is newly generated by causing the emitted lights s3 and s4 to interfere with each other by the 2×2 optical coupler 24c.

Thus, in the third embodiment, the 2×2 optical coupler is used for the output stage of the DQPSK signal d1, and the monitoring interference light generating section is constituted by the 2×2 optical coupler and the 2×1 optical multiplexer. Thereby, the same functions as those in the first embodiment can be realized.

Figure 19:
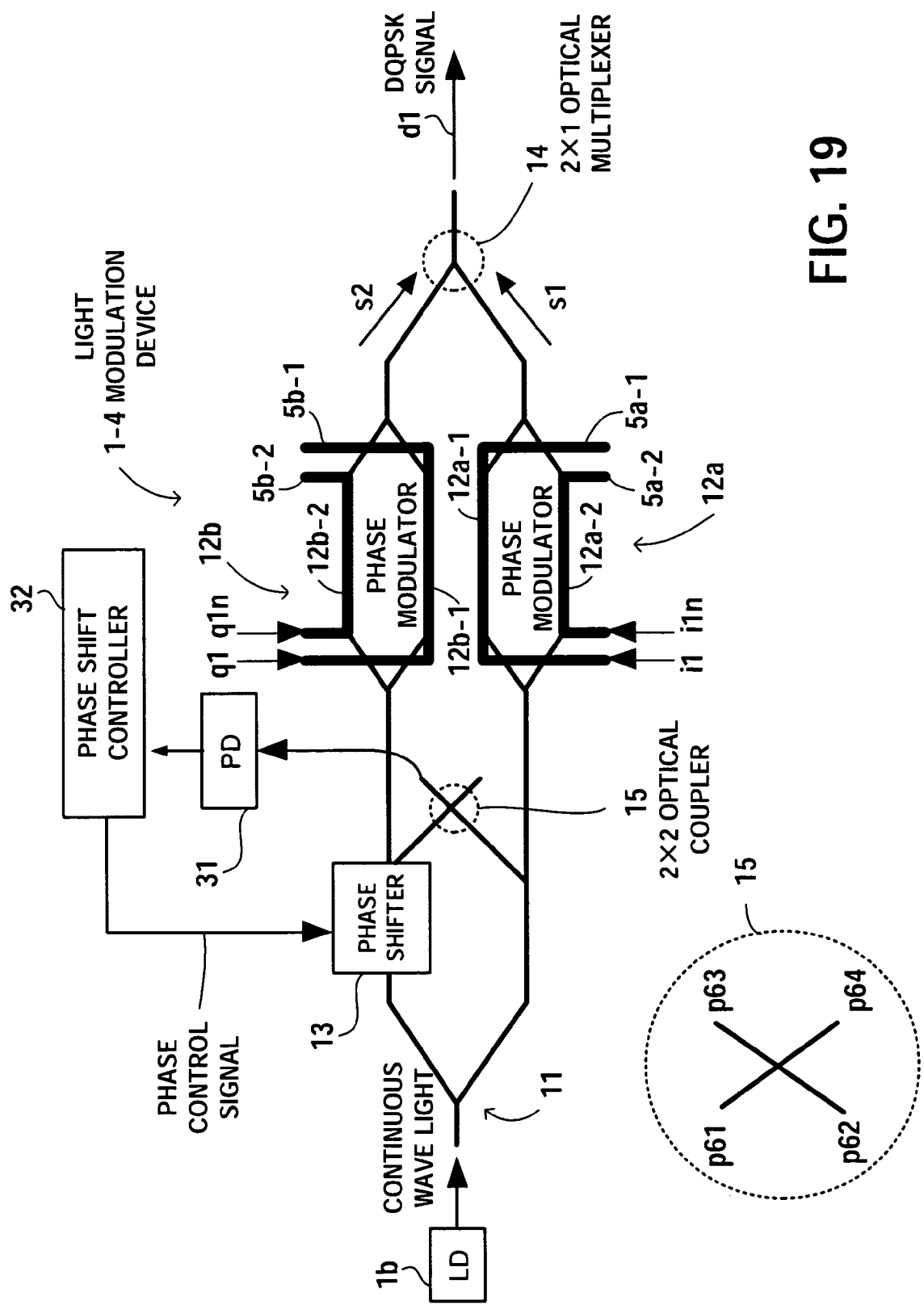
FIG. 19 shows a structure of a light modulation device.

Next, a modification example of the light modulation device will be described. FIG. 19 shows a structure of the light modulation device. A light modulation device 1-4 comprises the LD 1b, the branching section 11, the phase modulators 12a and 12b, the phase shifter 13, a 2×1 optical multiplexer 14, a 2×2 optical coupler 15, the PD 31 and the phase shift controller 32.

The 2×1 optical multiplexer 14 multiplexes modulated lights s1 and s2, which are phase-shifted from each other by $\pi/2$ because a phase difference of $\pi/2$ is set by the phase shifter 13, to generate the DQPSK signal d1.

In the 2×2 optical coupler 15, an output light from the phase shifter 13 is inputted to one input port p61 and the other branched input light is inputted to the other input port p62. Then, the output light and the input light are caused to interfere with each other. Thereby, a monitoring interference light having a phase shifted by $\pi/2$ with respect to that of the DQPSK signal d1 and having the minimum intensity when its own phase is $\pi/2$ is generated and outputted from an output port p63. Further, a monitoring interference light having a phase shifted by $\pi/2$ with respect to that of the DQPSK signal d1 and having the maximum intensity when its own phase is $\pi/2$ is generated and outputted from an output port p64.

The PD 31 receives any one of the two monitoring interference lights and outputs an electric signal according to the intensity. The phase shift controller 32 generates a phase control signal based on the electric signal and applies the phase control signal to the phase shifter 13 to control the phase shift amount such that the light intensity received by the PD 31 is maximized or minimized.

Thus, the monitoring interference light having the maximum or minimum intensity when its own phase is π/2 is generated at the upstream of the phase modulation processing and then monitored to perform the phase adjustment. By this structure, the same functions can also be realized.

Figure 20:
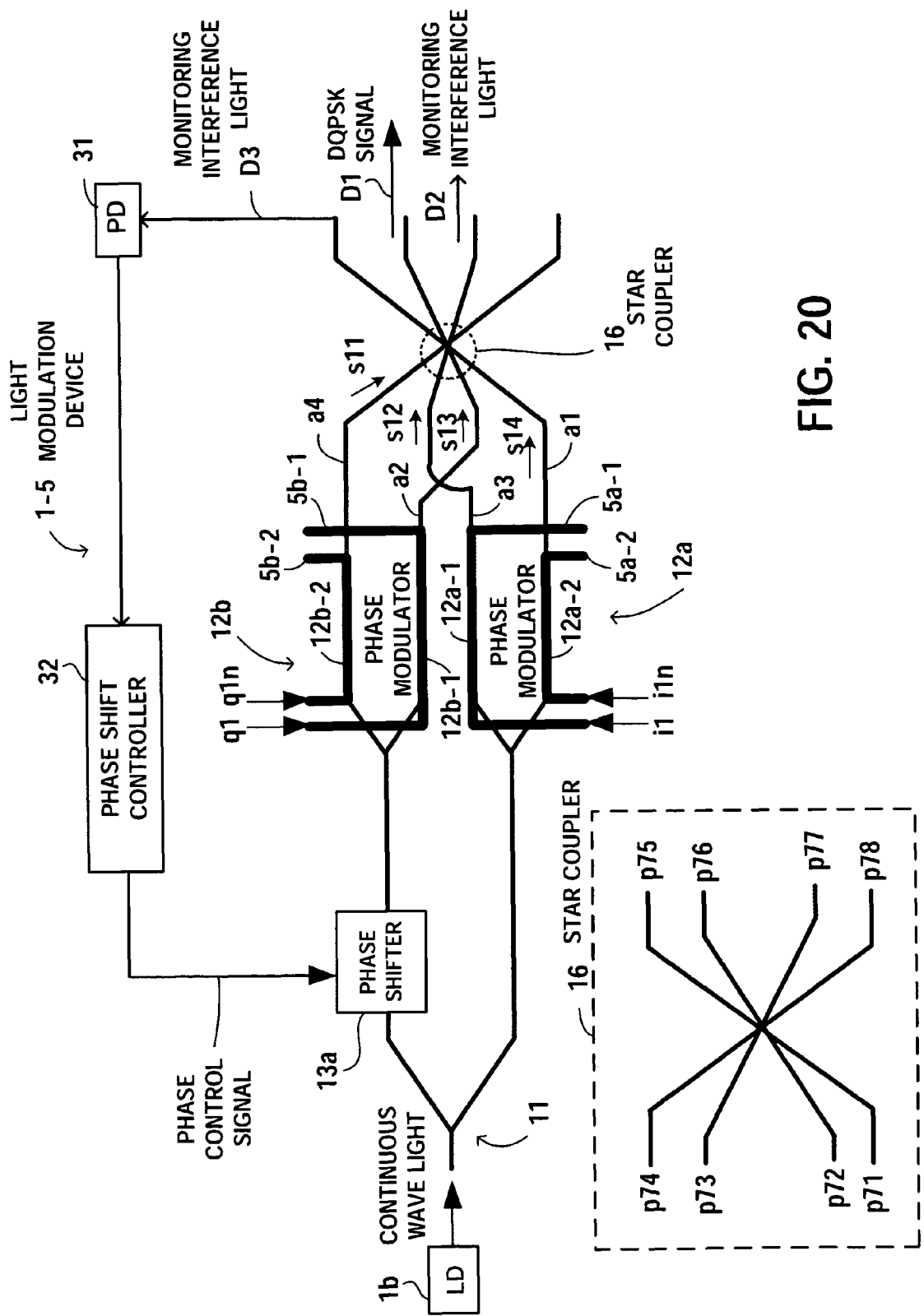
FIG. 20 shows a structure of a light modulation device to which a star coupler is applied.

Next, the light modulation device using an n×m (n and m are integers equal to or more than 2) optical interference waveguide (hereinafter, referred to as a star coupler) will be described. FIG. 20 shows a structure of the light modulation device using a star coupler. A light modulation device 1-5 comprises the LD 1b, the branching section 11, the phase modulators 12a and 12b, a phase shifter 13a, a 4×4 star coupler 16, the PD 31 and the phase shift controller 32. The phase shifter 13a here sets a phase of π/4.

The arm a1 of the phase modulator 12a is connected to an input port p71 of the star coupler 16 and the arm a2 of the phase modulator 12b is connected to an input port p72 of the star coupler 16. The arm a3 of the phase modulator 12a is connected to an input port p73 of the star coupler 16 and the arm a4 of the phase modulator 12b is connected to an input port p74 of the star coupler 16. An output port p75 of the star coupler 16 is connected to the PD 31.

A DQPSK signal D1 is outputted from an output port p76. A monitoring interference light D3 having a phase shifted by π/4 with respect to that of the DQPSK signal D1 and having the minimum intensity when its own phase is π/4 is outputted from the output port p75. A monitoring interference light D2 having a phase shifted by π/4 with respect to that of the DQPSK signal D1 and having the maximum intensity when its own phase is π/4 is outputted from an output port p77.

Figure 21:
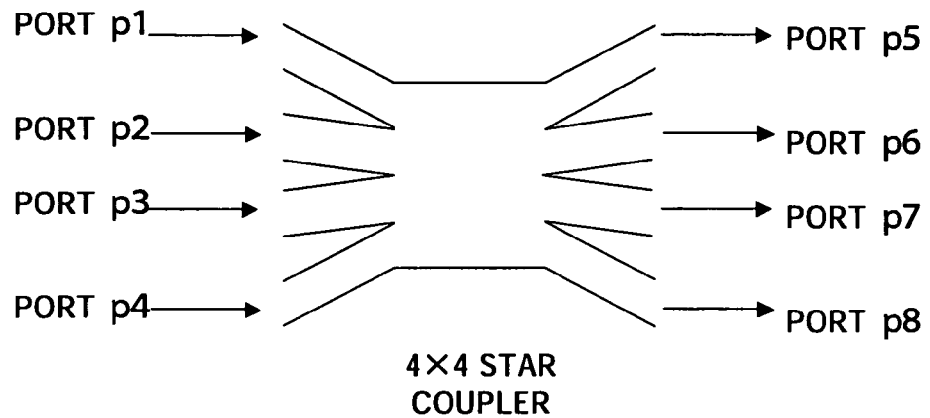
FIG. 21 shows a phase relationship between input light and output light of a 4×4 star coupler.

FIG. 21 shows a phase relationship between input light and output light of the 4×4 star coupler. FIG. 21 shows, for example, that in the 4×4 star coupler, when light passes from the port p1 to the port p5, a phase difference of 9π/8 is generated between the optical signals before and after passing through the star coupler.

Assuming here that $E_0$ is the amplitude and φ is the phase shift amount set by the phase shifter 13a, signal light passing through the arm a4 is represented by formula (11), signal light passing through the arm a3 is represented by formula (12), signal light passing through the arm a2 is represented by formula (13), signal light passing through the arm a1 is represented by formula (14), the DQPSK signal D1 is represented by formula (15), the monitoring interference light D2 is represented by formula (16), and the monitoring interference light D3 is represented by formula (17).

$$s11 = \frac{1}{2}E_0\exp j(\omega t + \phi - \pi/4) \tag{11}$$

$$s12 = \frac{1}{2}E_0\exp j(\omega t - \pi/4) \tag{12}$$

$$s13 = \frac{1}{2}E_0\exp j(\omega t + \phi + \pi/4) \tag{13}$$

$$s14 = \frac{1}{2}E_0\exp j(\omega t + \pi/4) \tag{14}$$

-continued $$D1 = \frac{1}{2}E_0\exp j(\omega t + \phi - \pi/4 + 3\pi/8) + \tag{15}$$
$$\frac{1}{2}E_0\exp j(\omega t - \pi/4 + \pi/8) +$$
$$\frac{1}{2}E_0\exp j(\omega t + \phi + \pi/4 - \pi/8) +$$
$$\frac{1}{2}E_0\exp j(\omega t + \pi/4 - 3\pi/8)$$
$$= \cos(\phi/2 + \pi/8)E_0\exp j(\omega t + \phi/2)$$

$$D2 = \frac{1}{2}E_0\exp j(\omega t + \phi + \pi/4 - 3\pi/8) + \tag{16}$$
$$\frac{1}{2}E_0\exp j(\omega t + \pi/4 - \pi/8) +$$
$$\frac{1}{2}E_0\exp j(\omega t + \phi - \pi/4 + \pi/8) +$$
$$\frac{1}{2}E_0\exp j(\omega t - \pi/4 + 3\pi/8)$$
$$= \cos(\phi/2 - \pi/8)E_0\exp j(\omega t + \phi/2)$$

$$D3 = \frac{1}{2}E_0\exp j(\omega t + \phi + \pi/4 + 9\pi/8) + \tag{17}$$
$$\frac{1}{2}E_0\exp j(\omega t + \pi/4 + 3\pi/8) +$$
$$\frac{1}{2}E_0\exp j(\omega t + \phi - \pi/4 - 3\pi/8) +$$
$$\frac{1}{2}E_0\exp j(\omega t - \pi/4 - 9\pi/8)$$
$$= \cos(\phi/2 + 3\pi/8)E_0\exp j(\omega t + \phi/2)$$

In formula (15), +3π/8 in the first term, +π/8 in the second term, −π/8 in the third term, and −3π/8 in the fourth term represent a phase change generated by causing the signal light to pass through the star coupler 16.

In formula (16), −3π/8 in the first term, −π/8 in the second term, +π/8 in the third term, and +3π/8 in the fourth term represent a phase change generated by causing the signal light to pass through the star coupler 16.

In formula (17), +9π/8 in the first term, +3π/8 in the second term, −3π/8 in the third term, and −9π/8 in the fourth term represent a phase change generated by causing the signal light to pass through the star coupler 16.

Figure 22:
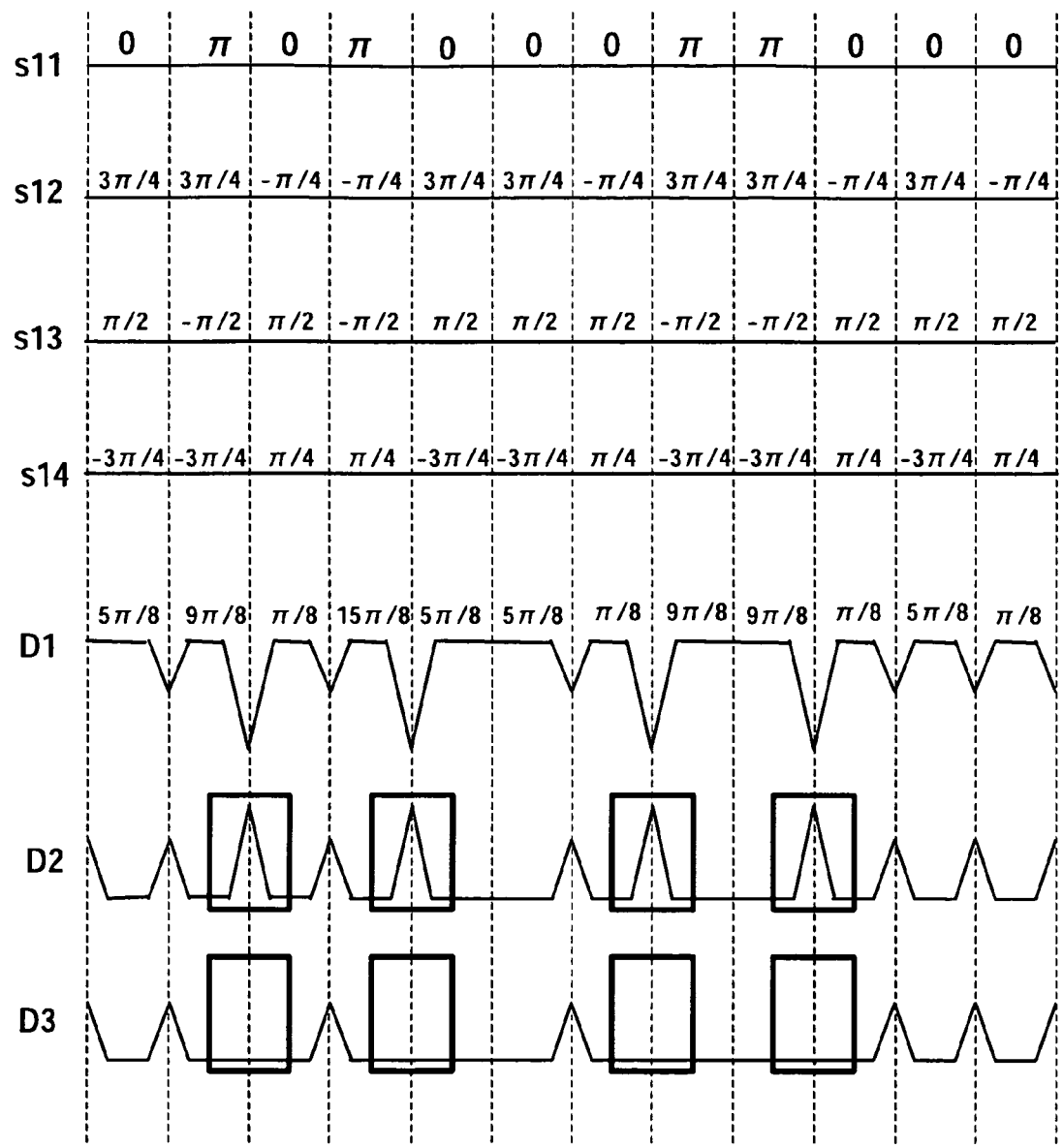
FIG. 22 shows one example of waveforms of a DQPSK signal and monitoring interference lights.
Figure 23:
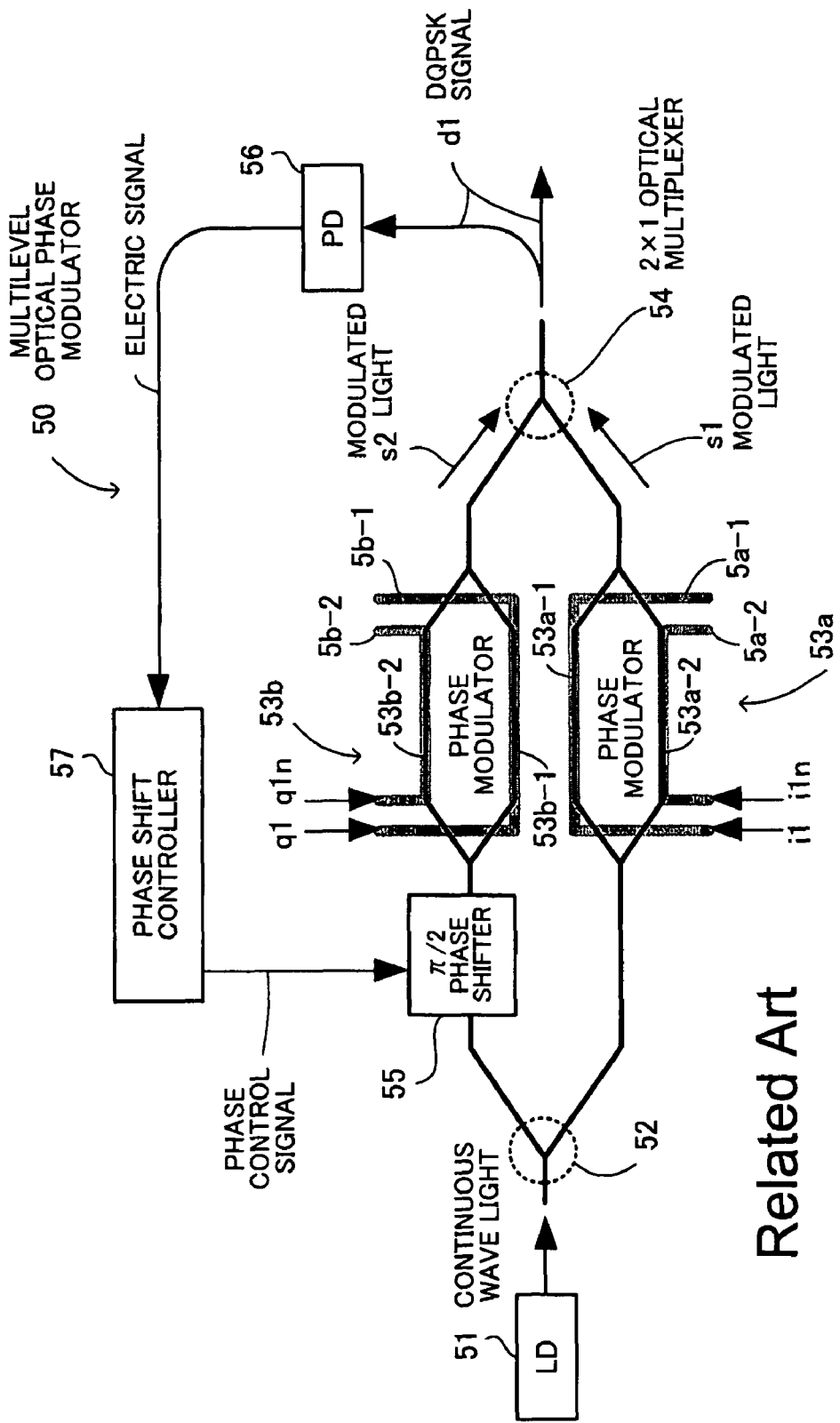
FIG. 23 shows a general multilevel optical phase modulator.
Figure 24:
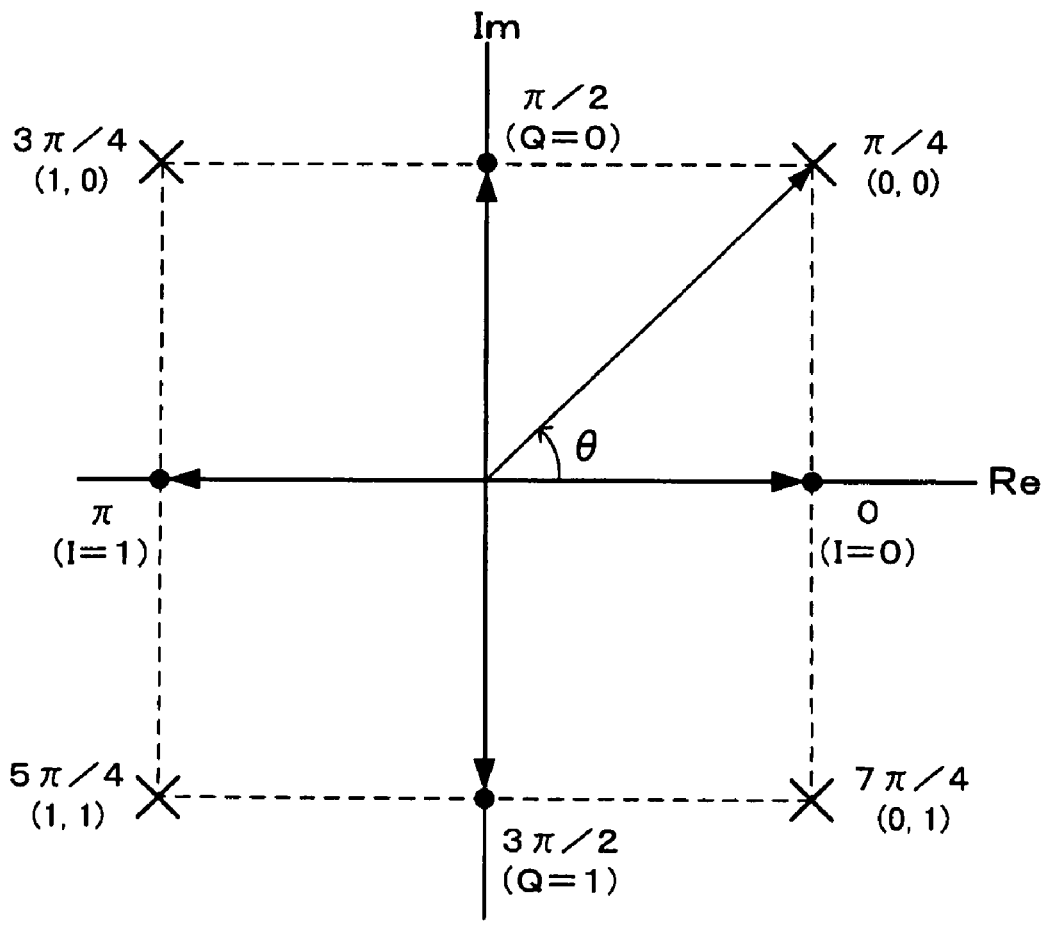
FIG. 24 shows a phase diagram for quadrature phase modulation.
Figure 25:
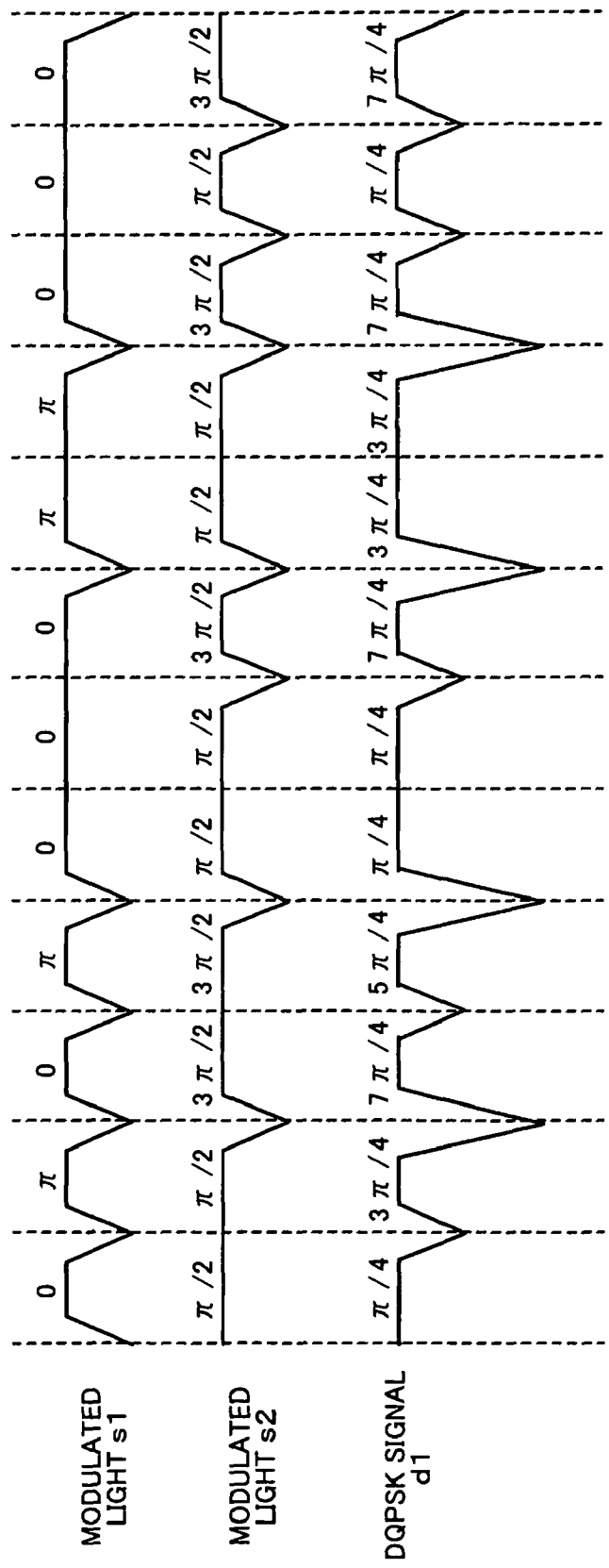
FIG. 25 shows one example of phase states of an optical multiplexed signal outputted from the multilevel optical phase modulator.
Figure 26:
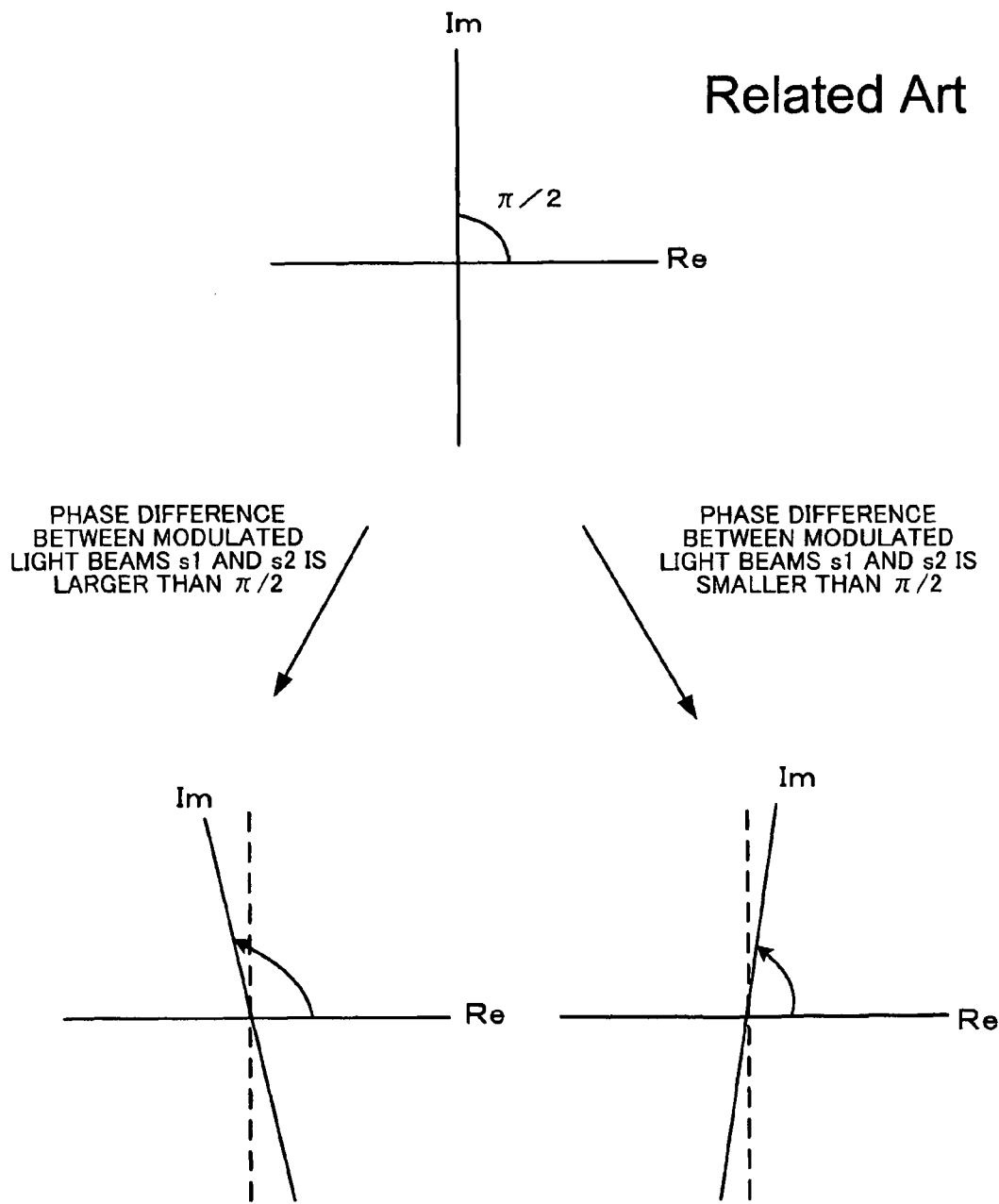
FIG. 26 shows a concept of a deviation of a phase difference.

FIG. 22 shows one example of waveforms of the DQPSK signal and the monitoring interference light. The horizontal axis represents the time and the vertical axis represents the light intensity. From formula (16), an output intensity (cos(φ/2−π/8) of the monitoring interference light D2 is 1 in the case of φ=π/4. Therefore, the monitoring interference light D2 is outputted as a waveform having the maximum intensity in the case of φ=π/4. From formula (17), an output intensity (cos(φ/2+3π/8) of the monitoring interference light D3 is zero in the case of φ=π/4. Therefore, the monitoring interference light D3 is outputted as a waveform having the minimum intensity in the case of φ=π/4.

As characteristics of the star coupler, a phase relationship between the input light and the output light is represented by formula (18) (J. Lightwave Tech. Vol. 24, No. 1, P. 171, January 2006). Here, φM represents the phase change amount of the output light with respect to that of the input light, $m_{left}$ represents the input port number, and $m_{right}$ represents the output port number.

$$\phi_M(m_{left}, m_{right}) = \frac{2\pi}{M}\left(m_{left} - \frac{M+1}{2}\right)\left(m_{right} - \frac{M+1}{2}\right) \tag{18}$$

Accordingly, since the phase difference is generated between optical signals before and after the passage as shown in FIG. 21, optical interference during the passage of light through the star coupler is optimally designed in consideration of the phase change conditions. Thereby, desired monitoring interference light can be extracted.

In the above-described structure of the light modulation device, a filter for extracting only a specific frequency component may be provided at the output stage of the PD 31. For example, in the view of a wavelength of the monitoring interference light in FIG. 14, a signal amplitude (a waveform of a sign n1 in FIG. 14) which appears at a place other than a place where the monitoring interference light has the maximum or minimum intensity is considered as a noise component. Accordingly, the light modulation device can also have a structure in which the noise component included in the electrical signal photoelectrically converted by the PD 31 is eliminated by providing the filter at the output stage of the PD 31.

As described above, control of the phase shifter to obtain the optimal phase difference can be easily performed using the structure of the light modulation device 1a. In the above description, an example of the DQPSK modulator is used. Further, in other multilevel phase modulators such as eight-value phase modulation and in the case of performing the control of the phase shifter, a structure of the light modulation device 1a can be used.

The light modulation device according to the present invention stabilizes the phase to be set during the phase modulation processing and aims at an improvement of optical communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A light modulation device, comprising:
a light modulator including a phase modulator which is provided for each of a plurality of input lights and which performs phase modulation of the input light, and a phase shifter which is provided at the upstream or downstream of at least one of the phase modulators and which shifts a phase of the input light or a phase of the phase-modulated light; and
a light interference section to cause a plurality of output lights outputted from the light modulator to interfere with each other,
wherein the light interference section causes the output lights to interfere with each other to generate a multilevel phase modulated signal and a monitoring interference light having a phase state different from that of the multilevel phase modulated signal,
wherein the first to the m-th phase modulators (m is an integer equal to or more than 2) are provided,
wherein the light interference section includes:
an n-th output interference section to cause output lights from an n-th phase modulator (n is an integer of 1 to m) to interfere with each other and to output an n-th modulated light and an n-th non-phase modulated light;
a multilevel phase modulated signal generating section to multiplex the first to the n-th modulated lights to generate the multilevel phase modulated signal; and
a monitoring interference light generating section to cause the first to the n-th non-phase modulated lights to interfere with each other to generate the monitoring interference light having a phase state different from that of the multilevel phase modulated signal, and
wherein the n-th output interference section (n is an integer of 1 to m) includes an n-th 2×2 optical coupler having two input ports and two output ports, in which two emitting waveguides of the n-th phase modulator and the two input ports are respectively connected to each other, and the n-th modulated light is outputted from the one output port as well as the n-th non-phase modulated light is outputted from the other output port.

2. The light modulation device according to claim 1, further comprising:
a monitor to receive the monitoring interference light and output an electric signal according to the intensity; and
a phase shift controller to generate a phase control signal based on the electric signal and apply the phase control signal to the phase shifter to control the phase shift amount to be set.

3. The light modulation device according to claim 1, wherein the light interference section generates, in the case of generating the multilevel phase modulated signal when a phase set by the phase shifter is $\phi$, the interference light having a phase state where the light intensity is maximized or minimized when its own phase is $\phi$.

4. The light modulation device according to claim 1, wherein a branching section to branch input light into a plurality of lights is provided, in which the branched lights are inputted as the plurality of input lights.

5. The light modulation device according to claim 1, wherein:
the first and the second phase modulators are provided, and wherein:
the multilevel phase modulated signal generating section includes a 2×1 optical multiplexer having two input ports and one output port, in which the first modulated light is inputted to the one input port, the second modulated light is inputted to the other input port, the first and the second modulated lights are multiplexed, and the multilevel phase modulated signal is outputted from the output port; and
the monitoring interference light generating section includes a third 2×2 optical coupler having two input ports and two output ports, in which the first non-phase modulated light is inputted to the one input port, the second non-phase modulated light is inputted to the other input port, and the first and the second non-phase modulated lights are caused to interfere with each other.

6. The light modulation device according to claim 1, wherein: the first and the second phase modulators are provided, and wherein: the multilevel phase modulated signal generating section includes a 2×2 optical multiplexer having two input ports and two output ports, in which the first modulated light is inputted to the one input port, the second modulated light is inputted to the other input port, the first and the second modulated lights are multiplexed, and the multilevel phase modulated signal is outputted from the output port; and the monitoring interference light generating section includes a third 2×1 optical coupler having two input ports and one output port, in which the first non-phase modulated light is inputted to the one input port, the second non-phase modulated light is inputted to the other input port, and the first and the second non-phase modulated lights are caused to interfere with each other.

7. The light modulation device according to claim 1, wherein: the first and the second phase modulators are provided, and wherein: the multilevel phase modulated signal generating section includes a first n×m optical multiplexer having n input ports (n is an integer equal to or more than 2) and m output ports (m is an integer equal to or more than 1), in which the first modulated light is inputted to the one input port, the second modulated light is inputted to the other input port, the first and the second modulated lights are multiplexed, and the multilevel phase modulated signal is outputted from the output port; and the monitoring interference light generating section includes a φ phase shifter which is provided for at least one of the branched input lights and which generates a phase difference of φ, and a second p×q optical multiplexer having p input ports (p is an integer equal to or more than 2) and q output ports (q is an integer equal to or more than 1), in which the φ phase shifter sets to φ a phase difference between the first non-phase modulated light and the second non-phase modulated light, and the first and the second non-phase modulated lights having a phase difference of φ are inputted to the second p×q optical multiplexer.

8. The light modulation device according to claim 1, wherein: the first and the second phase modulators are provided, and wherein: the multilevel phase modulated signal generating section includes a third 2×2 optical multiplexer having two input ports and two output ports, in which the first modulated light is inputted to the one input port, the second modulated light is inputted to the other input port, the first and the second modulated lights are multiplexed, and the multilevel phase modulated signal is outputted from the one output port; and the monitoring interference light generating section includes a fourth 2×2 optical coupler having two input ports and two output ports, and a 2×1 optical multiplexer having two input ports and one output port, in which in the fourth 2×2 optical coupler, the first non-phase modulated light is inputted to the one input port as well as the second non-phase modulated light is inputted to the other input port, the first and the second non-phase modulated lights are caused to interfere with each other, and a first signal light is outputted from the one output port as well as a second signal light is outputted from the other output port and in which in the 2×1 optical multiplexer, the first signal light is inputted to the one input port as well as the second signal light is inputted to the other input port, and the first and the second signal lights are multiplexed with each other.

9. The light modulation device according to claim 1, wherein:
the first to the m-th phase modulators are provided (m is an integer equal to or more than 2), and wherein:
the light interference section includes a p×q optical coupler (p is an integer equal to or more than 2m and q is an integer equal to or more than 2) whose input ports are connected to two emitting waveguides of the n-th phase modulator (n is an integer of 1 to m), in which the multilevel phase modulated signal is outputted from the one output port and the non-phase modulated light is outputted from the other output port.

10. The light modulation device according to claim 1, wherein:
the light interference section includes:
a multilevel phase modulated signal generating section to cause the output lights to interfere with each other to generate a multilevel phase modulated signal, and
a monitoring interference light generating section to cause a plurality of non-phase modulated lights to interfere with each other to generate the monitoring interference light having a phase state different from that of the multilevel phase modulated signal, the lights being one light passing through the phase shifter provided for at least one of the branched input lights and being the other light not passing through the phase shifter.

11. A light modulation device for performing multilevel phase modulation, comprising:
a branching section to branch input light into a plurality of lights;
a phase shifter to shift a phase of at least one of the branched input lights by φ based on a phase control signal;
a phase modulator to perform phase modulation of output light from the phase shifter and perform phase modulation of the branched input light;
a light interference section to cause phase-modulated output lights outputted from the phase modulator to interfere with each other to generate a multilevel phase modulated signal and monitor interference light as interference light for monitor;
a monitor to receive the monitoring interference light and output an electric signal according to the light intensity; and
a phase shift controller to generate a phase control signal based on the electric signal and apply the phase control signal to the phase shifter to control a phase φ to be set, wherein:
the light interference section generates the monitoring interference light having a phase state where the light intensity is maximized or minimized when its own phase is φ,
the phase controller applies the phase control signal to the phase shifter to control the phase shift amount such that an intensity of the monitoring interference light received by the monitor is maximized or minimized,
the branching section branches input light into two,
the phase shifter sets to φ a phase difference between the two branched input lights based on the phase control signal,
the phase modulator includes a first phase modulator and a second phase modulator, in which the first phase modulator performs phase modulation of one branched output light and the second phase modulator performs phase modulation of the other branched input light,
the light interference section causes an output light from the first phase modulator and that from the second phase modulator to interfere with each other, and
the light interference section includes:
a first output interference section causing output lights from the first phase modulator to interfere with each other and outputting a first modulated light and a first emitted light;
a second output interference section causing output lights from the second phase modulator to interfere with each other and outputting a second modulated light and a second emitted light;
a multilevel phase modulated signal generating section multiplexing the first modulated light and the second modulated light to generate the multilevel phase modulated signal, the first and the second modulated lights being phase-shifted from each other by φ because a phase difference of φ is set by the phase shifter; and
a monitoring interference light generating section causing the first emitted light and the second emitted light to interfere with each other to generate the monitoring interference light having a phase state different from that of the multilevel phase modulated signal.

12. The light modulation device according to claim 11, wherein the light interference section includes a optical interference guide having n or more input ports and m output ports when n output lights are outputted from the phase modulator.

13. The light modulation device according to claim 11, wherein:
the first output interference section includes a first 2×2 optical coupler having two input ports and two output ports, in which two emitting waveguides of the first phase modulator and the two input ports are respectively connected, and the first modulated light is outputted from the one output port as well as the first emitted light is outputted from the other output port;
the second output interference section includes a second 2×2 optical coupler having two input ports and two output ports, in which two emitting waveguides of the second phase modulator and the two input ports are respectively connected, and the second modulated light is outputted from the one output port as well as the second emitted light is outputted from the other output port;
the multilevel phase modulated signal generating section includes a 2×1 optical multiplexer having two input ports and one output port, in which the one input port is connected to the output port of the first 2×2 optical coupler from which the first modulated light is outputted, the other input port is connected to the output port of the second 2×2 optical coupler from which the second modulated light is outputted, the first and the second modulated lights are multiplexed and the multilevel phase modulated signal is outputted from the output port; and
the monitoring interference light generating section includes a third 2×2 optical coupler having two input ports and two output ports, in which the one input port is connected to the output port of the first 2×2 optical coupler from which the first emitted light is outputted, the other input port is connected to the output port of the second 2×2 optical coupler from which the second emitted light is outputted, the first and the second emitted lights are caused to interfere with each other and a first monitoring interference light having a phase shifted by $\phi$ with respect to that of the multilevel phase modulated signal and having the maximum intensity when its own phase is $\phi$ is outputted from the one output port as well as a second monitoring interference light having a phase shifted by $\phi$ with respect to that of the multilevel phase modulated signal and having the minimum intensity when its own phase is $\phi$ is outputted from the other output port.

14. The light modulation device according to claim 11, wherein: the first output interference section includes a first 2×2 optical coupler having two input ports and two output ports, in which two emitting waveguides of the first phase modulator and the two input ports are respectively connected, and the first modulated light is outputted from the one output port as well as the first emitted light is outputted from the other output port; the second output interference section includes a second 2×2 optical coupler having two input ports and two output ports, in which two emitting waveguides of the second phase modulator and the two input ports are respectively connected, and the second modulated light is outputted from the one output port and the second emitted light is outputted from the other output port; the multilevel phase modulated signal generating section includes a 2×2 optical multiplexer having two input ports and two output ports, in which the one input port is connected to the output port of the first 2×2 optical coupler from which the first modulated light is outputted, the other input port is connected to the output port of the second 2×2 optical coupler from which the second modulated light is outputted, the first and the second modulated lights are multiplexed and the multilevel phase modulated signal is outputted from the output port; the monitoring interference light generating section includes a third 2×1 optical coupler having two input ports and one output port, in which the one input port is connected to the output port of the first 2×2 optical coupler from which the first emitted light is outputted, the other input port is connected to the output port of the second 2×2 optical coupler from which the second emitted light is outputted, the first and the second emitted lights are caused to interfere with each other and a monitoring interference light having a phase shifted by $\phi$ with respect to that of the multilevel phase modulated signal and having the maximum or minimum intensity when its own phase is $\phi$ is outputted from the output port.

15. The light modulation device according to claim 11, wherein: the first output interference section includes a first 2×2 optical coupler having two input ports and two output ports, in which two emitting waveguides of the first phase modulator and the two input ports are respectively connected, and the first modulated light is outputted from the one output port as well as the first emitted light is outputted from the other output port; the second output interference section includes a second 2×2 optical coupler having two input ports and two output ports, in which two emitting waveguides of the second phase modulator and the two input ports are respectively connected, and the second modulated light is outputted from the one output port as well as the second emitted light is outputted from the other output port; the multilevel phase modulated signal generating section includes a first 2×1 optical multiplexer having two input ports and one output port, in which the one input port is connected to the output port of the first 2×2 optical coupler from which the first modulated light is outputted, the other input port is connected to the output port of the second 2×2 optical coupler from which the second modulated light is outputted, the first and the second modulated lights are multiplexed and the multilevel phase modulated signal is outputted from the output port; and the monitoring interference light generating section includes a $\phi$ phase shifter which is provided for at least one of the branched input lights and which generates a phase difference of $\phi$, and a second 2×1 optical multiplexer having two input ports and one output port, in which in the second 2×1 optical multiplexer, the first emitted light outputted from the first 2×2 optical coupler and the second emitted light outputted from the second 2×2 optical coupler, which have a phase difference of $\phi$, are inputted to the two input ports, and the monitoring interference light having a phase shifted by $\phi$ with respect to that of the multilevel phase modulated signal and having the maximum or minimum intensity when its own phase is $\phi$ is outputted from the output port.

16. The light modulation device according to claim 11, wherein: the first output interference section includes a first 2×2 optical coupler having two input ports and two output ports, in which two emitting waveguides of the first phase modulator and the two input ports are respectively connected, and the first modulated light is outputted from the one output port as well as the first emitted light is outputted from the other output port; the second output interference section includes a second 2×2 optical coupler having two input ports and two output ports, in which two emitting waveguides of the second phase modulator and the two input ports are respectively connected, and the second modulated light is outputted from the one output port as well as the second emitted light is outputted from the other output port; the multilevel phase modulated signal generating section includes a third 2×2 optical multiplexer having two input ports and two output ports, in which the one input port is connected to the output port of the first 2×2 optical coupler from which the first modulated light is outputted, the other input port is connected to the output port of the second 2×2 optical coupler from which the second modulated light is outputted, the first and the second modulated lights are multiplexed and the multilevel phase modulated signal is outputted from the one output port; and the monitoring interference light generating section includes a fourth 2×2 optical coupler having two input ports and two output ports and a 2×1 optical multiplexer having two input ports and one output port, in which in the fourth 2×2 optical coupler, the first emitted light is inputted to the one input port as well as the second emitted light is inputted to the other input port, the first and the second emitted lights are caused to interfere with each other, and a first signal light is outputted from the one output port as well as a second signal light is outputted from the other output port and in which in the 2×1 optical multiplexer, the first signal light is inputted to the one input port as well as the second signal light is inputted to the other input port, the first and the second signal lights are multiplexed and the monitoring interference light having a phase shifted by $\phi$ with respect to that of the multilevel phase modulated signal and having the maximum or minimum intensity when its own phase is $\phi$ is outputted from the output port.

17. A light modulation device for performing multilevel phase modulation, comprising:
 a branching section to branch input light into two;
 a phase shifter to set to $\phi$ a phase difference between two branched input lights, the phase shifter being provided for at least one of the branched input lights;
 a first phase modulator to perform phase modulation of output light from the phase shifter to generate a first modulated light;
 a second phase modulator to perform phase modulation of the other branched input light to generate a second modulated light;
 a 2×1 optical multiplexer to multiplex the first modulated light and the second modulated light to generate the multilevel phase modulated signal, the first and the second modulated lights being phase-shifted from each other by $\phi$ because a phase difference of $\phi$ is set by the phase shifter;
 a 2×2 optical coupler to input two branched lights with a phase difference of $\phi$, cause them to interfere with each other, and output from the one output port a first monitoring interference light having a phase shifted by $\phi$ with respect to that of the multilevel phase modulated signal and having the maximum intensity when its own phase is $\phi$ as well as outputting from the other output port a second monitoring interference light having a phase shifted by $\phi$ with respect to that of the multilevel phase modulated signal and having the minimum intensity when its own phase is $\phi$;
 a monitor to receive either the first monitoring interference light or the second monitoring interference light and output an electric signal according to a light intensity; and
 a phase shift controller to generate a phase control signal based on the electric signal and apply the phase control signal to the phase shifter to control the phase shift amount to be set such that the light intensity received by the monitor is maximized or minimized.

* * * * *